US012691967B2

(12) United States Patent     (10) Patent No.:   US 12,691,967 B2

Hu et al.           (45) Date of Patent:     Jul. 28, 2026

(54) ELECTRIC ALL-TERRAIN VEHICLE

(71) Applicant: Zhejiang CFMOTO Power Co., Ltd., Hangzhou (CN)

(72) Inventors: Xiayang Hu, Hangzhou (CN);
Yunqiang Huang, Hangzhou (CN);
Changjiang Li, Hangzhou (CN);
Fuying Cheng, Hangzhou (CN); Jiahui Hou, Hangzhou (CN); Jianwu Liang, Hangzhou (CN); Guangxuan Feng, Hangzhou (CN); Jian Song, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 216 days.

(21) Appl. No.: 18/775,842

(22) Filed: Jul. 17, 2024

(65) Prior Publication Data

US 2024/0367528 A1     Nov. 7, 2024

Related U.S. Application Data

(63) Continuation of application No. PCT/CN2023/072305, filed on Jan. 16, 2023.

(30) Foreign Application Priority Data

Jan. 25, 2022    (CN) ......................... 202210165678.X

(51) Int. Cl.
   *B62K 5/01*        (2013.01)
   *B60K 1/04*        (2019.01)
          (Continued)

(52) U.S. Cl.
   CPC ................. *B62K 5/01* (2013.01); *B60K 1/04* (2013.01); *B60K 17/16* (2013.01); *B60K 17/22* (2013.01);
          (Continued)

(58) Field of Classification Search
   CPC .......... B62K 5/01; B60K 17/16; B60K 17/22; B60K 17/354; B60K 17/356; B60K 2001/0422
   See application file for complete search history.

(56) References Cited

U.S. PATENT DOCUMENTS 7,610,132 B2 * 10/2009 Yanai ....................... B62D 5/04
                                      180/443
7,837,003 B2 * 11/2010 Tsutsumikoshi ......... B62K 5/01
                                      180/444
(Continued)

FOREIGN PATENT DOCUMENTS

CN       103625277 A      3/2014
CN       105000096 A     10/2015
(Continued)

*Primary Examiner* — Jeffrey J Restifo
(74) *Attorney, Agent, or Firm* — Shewchuk IP Services, LLC; Jeffrey D. Shewchuk

(57) ABSTRACT

An electric all-terrain vehicle includes a set of wheels, a drive system, a battery pack, and an MCU. A projection of the MCU, a projection of the battery pack, and a projection of the electric motor all on a horizontal plane cooperatively define a Tri-core system projection area with a Tri-core longitudinal length. A ratio of the wheelbase distance to the Tri-core longitudinal length is in the range from 0.7 to 2.5. The positions of the Tri-core system are reasonably arranged and the relevant components are highly integrated, the center of gravity of the entire vehicle are reasonably allocated, thereby making the overall performance of the vehicle more superior and achieving better driving performance.

20 Claims, 23 Drawing Sheets

(51) Int. Cl.

| | |
|---|---|
| *B60K 17/16* | (2006.01) |
| *B60K 17/22* | (2006.01) |
| *B60K 17/354* | (2006.01) |
| *B60K 17/356* | (2006.01) |
| *B60L 50/60* | (2019.01) |
| *B60L 50/64* | (2019.01) |
| *B62J 43/16* | (2020.01) |
| *B60K 17/04* | (2006.01) |

(52) U.S. Cl.

CPC .......... *B60K 17/354* (2013.01); *B60K 17/356*
(2013.01); *B60L 50/64* (2019.02); *B60L 50/66*
(2019.02); *B62J 43/16* (2020.02); *B60K*
*2001/0422* (2013.01); *B60K 17/04* (2013.01);
*B62K 2204/00* (2013.01)

(56) References Cited

U.S. PATENT DOCUMENTS

| | | | | |
|---|---|---|---|---|
| 9,873,316 | B2 * | 1/2018 | Lovold | .................... B62K 5/01 |
| 9,963,168 | B2 | 5/2018 | Suzuki | |
| 11,260,923 | B2 * | 3/2022 | Bezeau-Tremblay | .... B60T 8/00 |
| 11,358,633 | B2 | 6/2022 | Davies et al. | |
| 12,384,482 | B2 * | 8/2025 | Dong | ..................... B62K 11/04 |
| 12,497,121 | B2 * | 12/2025 | Christini | ................. B60L 50/61 |
| 2004/0084239 | A1 * | 5/2004 | Hioki | ........................ B62K 5/01 |
| | | | | 180/291 |
| 2005/0224262 | A1 | 10/2005 | Ima et al. | |
| 2006/0207823 | A1 | 9/2006 | Okada et al. | |
| 2010/0194086 | A1 | 8/2010 | Yamamura et al. | |
| 2021/0354539 | A1 | 11/2021 | Miao | |
| 2023/0093742 | A1 * | 3/2023 | Rubanovich | ............ B62J 43/10 |
| | | | | 180/233 |
| 2024/0083538 | A1 * | 3/2024 | Bouchard | ................ B62M 7/06 |
| 2024/0343108 | A1 * | 10/2024 | Decuzzi | ................. H02K 7/006 |
| 2024/0367528 | A1 * | 11/2024 | Hu | ......................... B60K 17/16 |
| 2025/0282439 | A1 * | 9/2025 | Moninger | ............... B62J 43/16 |

FOREIGN PATENT DOCUMENTS

| | | | |
|---|---|---|---|
| CN | 208664935 | U | 3/2019 |
| CN | 211364241 | U | 8/2020 |
| CN | 214776329 | U | 11/2021 |
| CN | 218229275 | U | 1/2023 |
| CN | 218229274 | U | 6/2023 |
| JP | 2012046077 | A | 3/2012 |

\* cited by examiner

ELECTRIC ALL-TERRAIN VEHICLE

RELATED APPLICATION INFORMATION

The present application is a continuation of and claims the benefits of priority to International Application Number PCT/CN2023/072305, filed on Jan. 16, 2023, which is based upon and claims the benefits of priority to Chinese Patent Application No. 202210165678.X, filed with the Chinese Patent Office on Jan. 25, 2022. The entire contents of the above-referenced applications are incorporated herein by reference.

FIELD OF THE DISCLOSURE

The present disclosure relates to the field of vehicles, and particularly to an electric all-terrain vehicle.

BACKGROUND OF THE DISCLOSURE

All-terrain vehicles (ATVs) are designed for use on various types of rough terrain, able to drive freely on terrains that are difficult for ordinary vehicles to traverse. Modern ATVs, also sometimes known as "All-terrain four-wheeled off-road locomotive" vehicles, are simple to use, practical, and have good off-road performance. An ATV can generate greater friction with the ground and reduce the pressure of the vehicle on the ground, thereby making it easy to drive on beaches, river beds, forest roads, streams, and harsh desert terrains. ATVs can be used to carry people or transport goods.

Under the call for energy conservation and emission reduction and associated trend of global electrification, the electrification of ATVs has become an unstoppable development force. However, electrification means that the ATV needs to be equipped with a battery pack to store locomotive energy for the ATV as well as a powerful electric drive motor, while still being equipped with a traditional drive system from the electric drive motor to the wheels. The longer the range desired for the ATV, the more the volume and weight of the battery pack will increase accordingly. As the main source of driving force for an electric ATV, the battery, motor and electric control system are the most core components of any electric ATV, and the combination of the battery, motor and electric control system will hereinafter be referred as the "Tri-core system". The layout of the Tri-core system is closely related to the transmission path and arrangement of the drive train of electric all-terrain vehicles. A good arrangement of the Tri-core system can greatly improve the performance and assembly space of the entire vehicle. Therefore, the arrangement of the relevant components of each system within the limited frame support space is a research topic to which technical personnel in this field are dedicated.

SUMMARY OF THE INVENTION

An electric all-terrain vehicle (ATV) is provided to solve at least one problem above.

In a first aspect, an electric ATV includes a frame, a vehicle cover, a set of wheels, a drive system, a battery pack, and a Motor Control Unit (MCU). The vehicle cover is at least partially arranged on the frame. The set of wheels has at least two front wheels defining a front wheel axis centerline and at least two rear wheels defining a rear wheel axis, with the front and rear wheels arranged on the frame. A wheelbase distance is defined between the front wheel axis centerline and the rear wheel axis. The drive system is supported by the frame and includes an electric motor. The battery pack is supported by the frame and provides electric energy for the electric motor for locomotion of the electric ATV. The MCU is electrically connected to the electric motor. A projection of the MCU, a projection of the battery pack, and a projection of the electric motor all on a horizontal plane cooperatively define a Tri-core system projection area. A ratio of the wheelbase distance to a Tri-core longitudinal length is in the range from 0.7 to 2.5.

In a second aspect, the electric motor is packaged in a prime mover assembly further including a gearbox assembly, a differential and a drive train offset. The gearbox assembly has a gearbox input shaft with a gearbox input shaft axis, and the drive train offset has an offset output shaft with an offset output shaft axis. A total offset distance from the gearbox input shaft axis to the offset output shaft axis is in the range from 80 mm to 900 mm.

In a third aspect, the prime mover assembly further includes an engine parking brake. The engine parking brake is mounted to the gearbox assembly on an opposite side to the electric motor.

The positions of the Tri-core system are reasonably arranged, the relevant components are highly integrated, and the center of gravity of the entire vehicle is reasonably allocated, thereby making the overall performance of the vehicle more superior and achieving better driving performance.

For better understanding of the above objects, features and advantages of the present disclosure, the embodiments of the present disclosure will be described in detail below with reference to the accompanying drawings.

BRIEF DESCRIPTION OF THE DRAWINGS

The depicted embodiments only represent several embodiments of the present invention, and the descriptions thereof are specific and detailed, but should not be construed as a limitation on the scope of the invention. In the figures.

DETAILED DESCRIPTION

Workers of ordinary skill in the art may make numerous modifications and improvements without departing from the concepts of the present invention. Therefore, the protection scope of the patent of the present invention is defined to include the full breadth of the appended claims.

Figure 1:
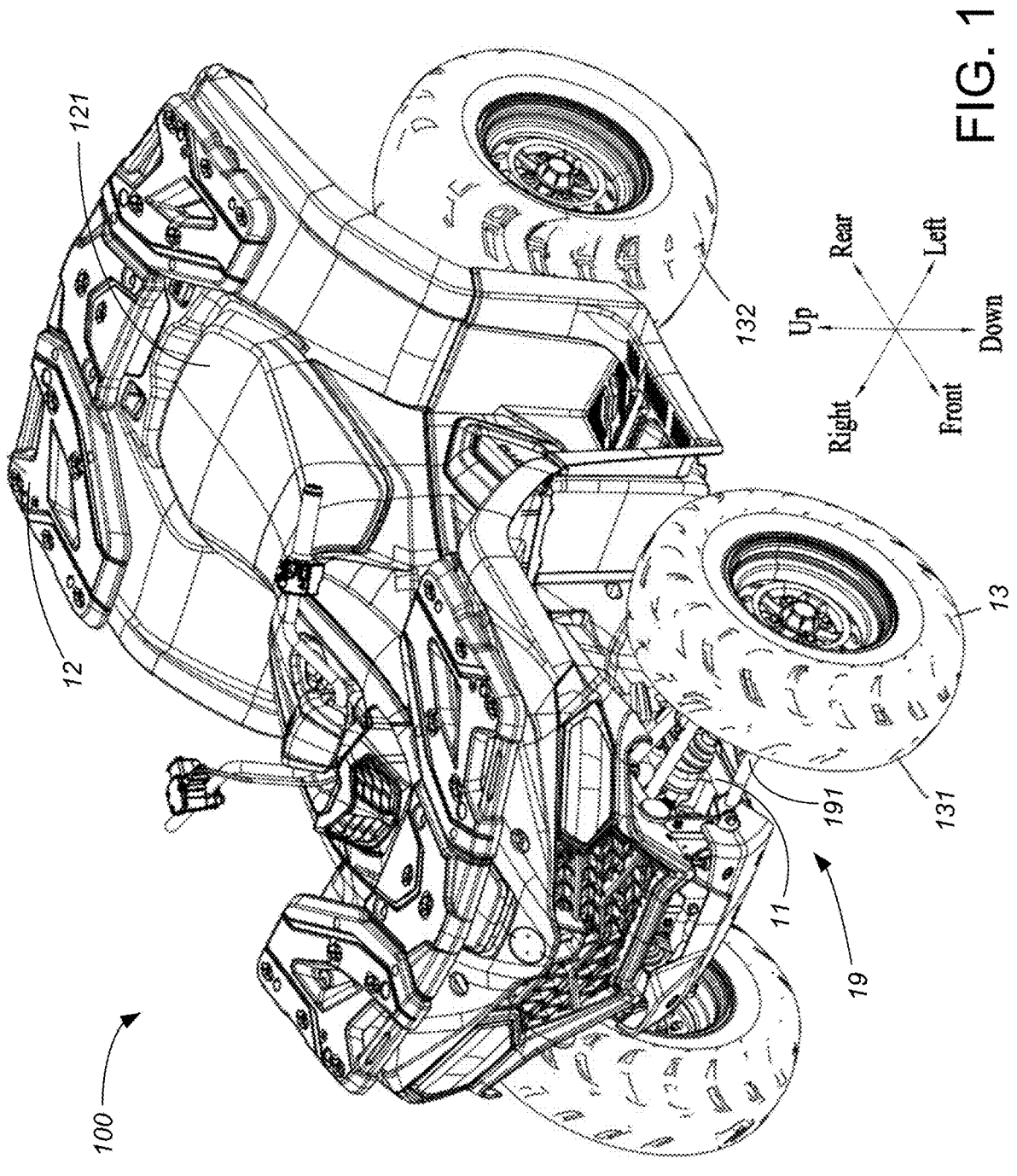
FIG. 1 is a front left perspective view of an electric all-terrain vehicle ("ATV")

FIG. 1 shows a first preferred electric all-terrain vehicle (ATV) 100, which includes a frame 11, a vehicle cover 12 with a seat cushion 121, a set of wheels 13 and a suspension 19. The set of wheels 13 includes a pair of front wheels 131 and a pair of rear wheels 132. The general orientations of front, rear, up (upper), down (lower), left and right for the electric ATV 100 are defined in FIG. 1. The terms "up", "down" "vertical", "horizontal", etc. used herein assume the vehicle wheels are on a flat, horizontal surface, i.e., not on a slope, and with the wheel/tire sizes depicted. The pair of front wheels 131 are connected to the frame 11 through a front suspension 191, and the pair of rear wheels 132 are connected to the frame 11 through a rear suspension 192.

Figure 2:
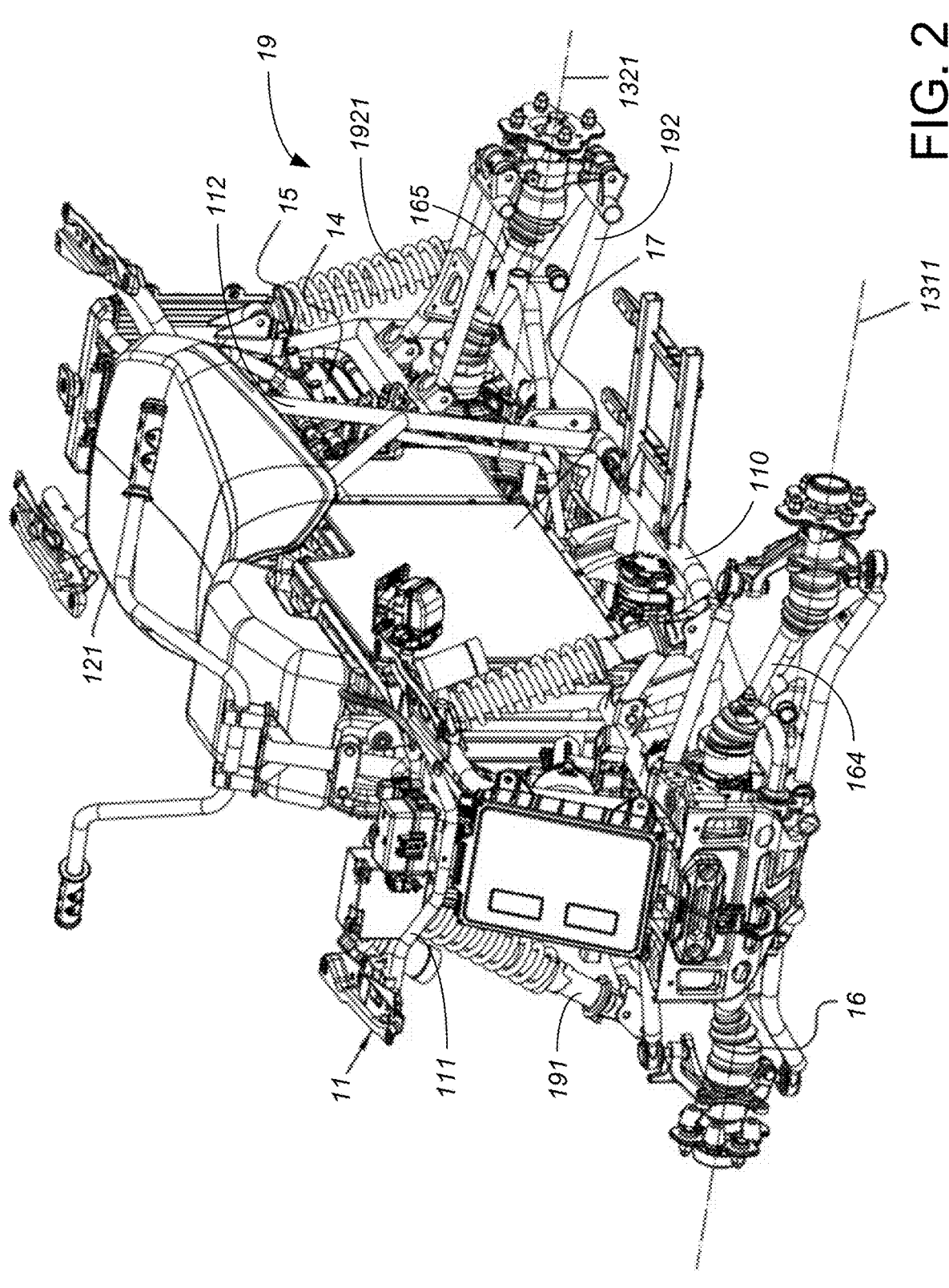
FIG. 2 is a front left perspective view of the electric ATV of FIG. 1 without showing the vehicle cover or the set of wheels.
Figure 3:
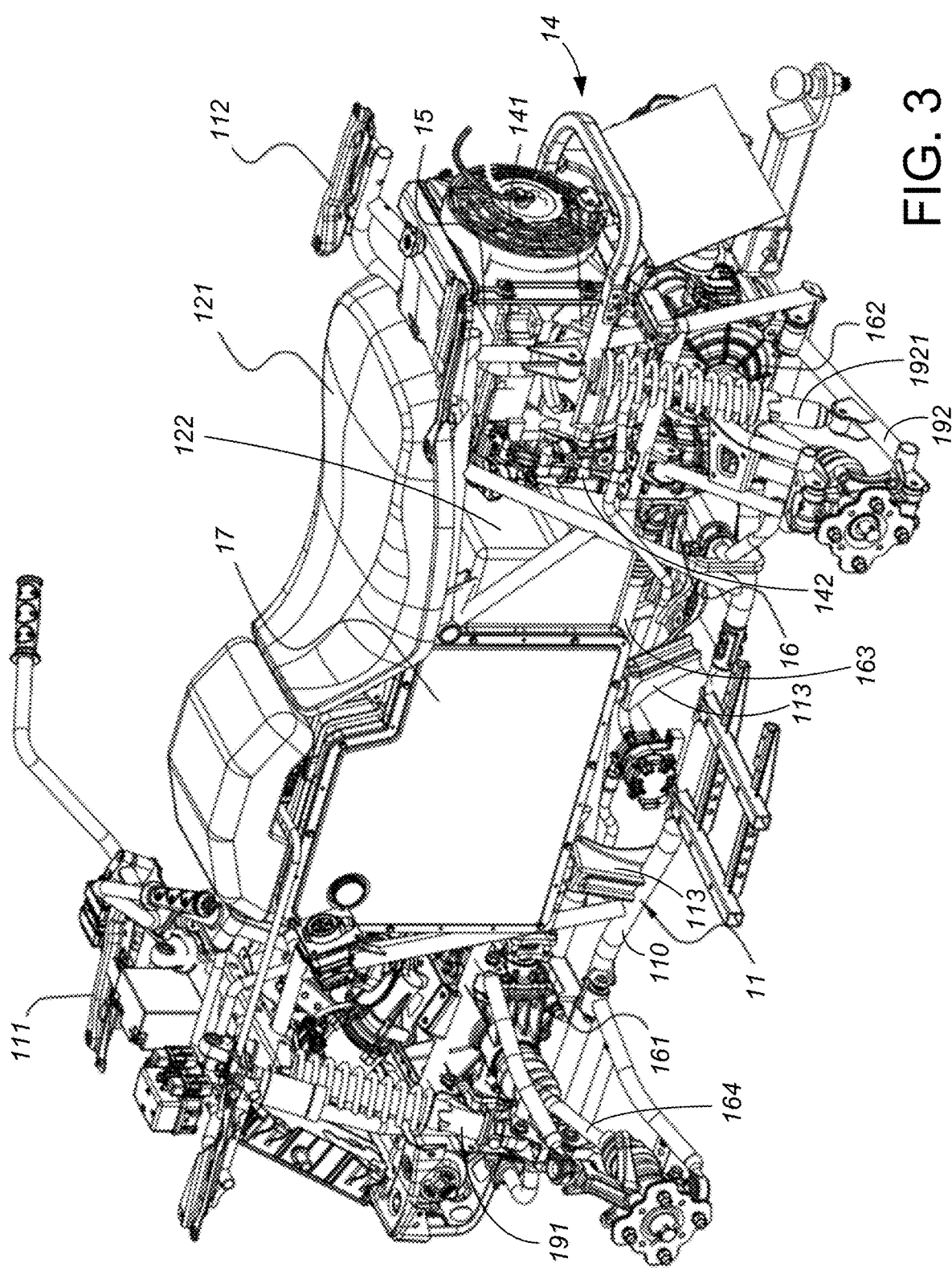
FIG. 3 is a rear left perspective view of the ATV portions shown in FIG. 2.
Figures 4, 5:
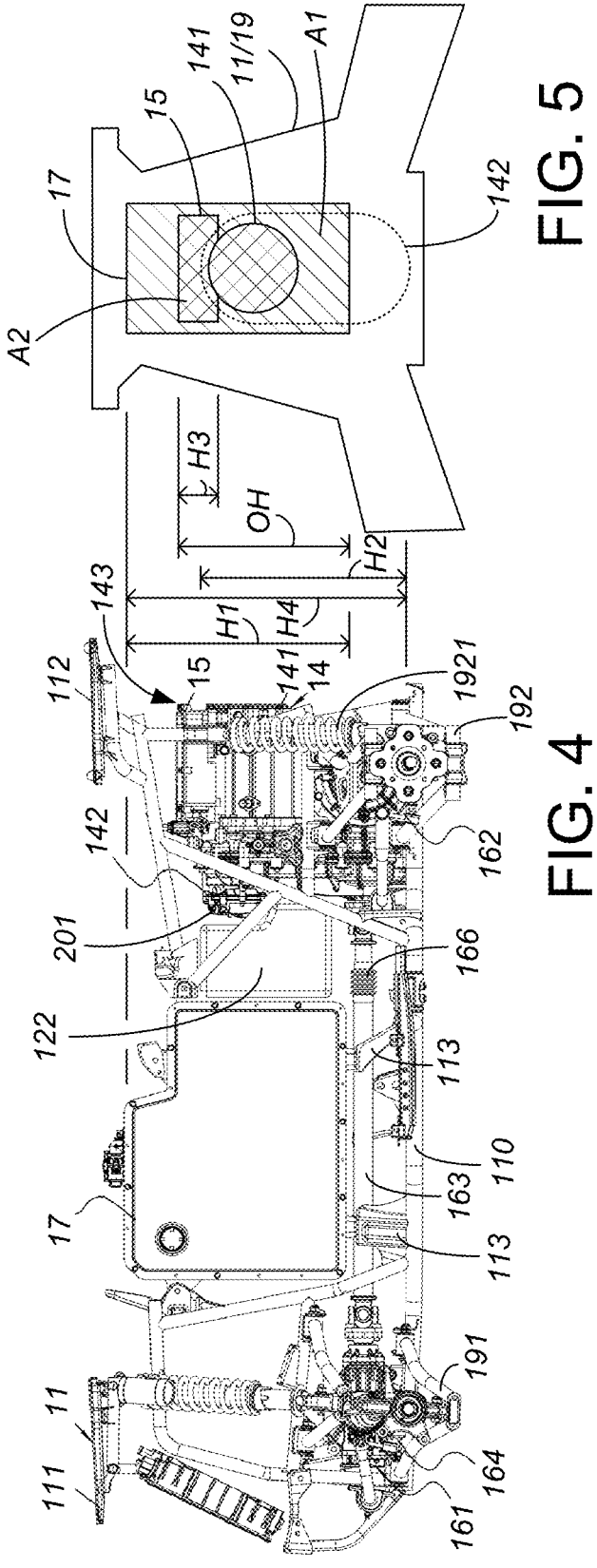
FIG. 4 is a left side view of the frame, Tri-core system, drive train and suspension of the ATV of FIGS. 1-3.
FIG. 5 is a schematic rear view of the Tri-core system of FIG. 4 relative to an outline of the frame and suspension.
Figure 6:
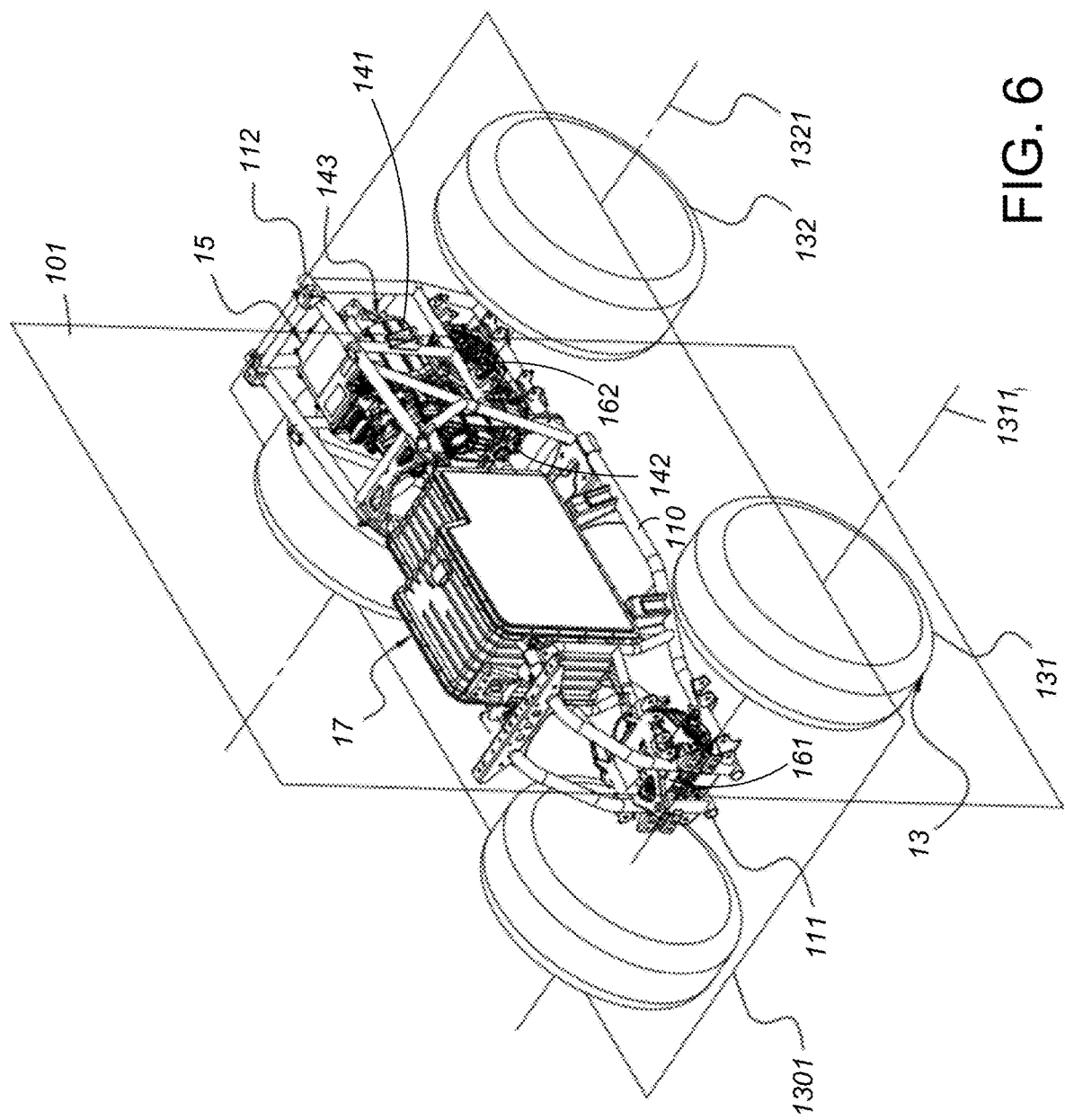
FIG. 6 is a front left perspective view of the Tri-core system and differentials of FIGS. 1-4, showing portions of the frame and schematically showing the set of wheels.
Figure 23:
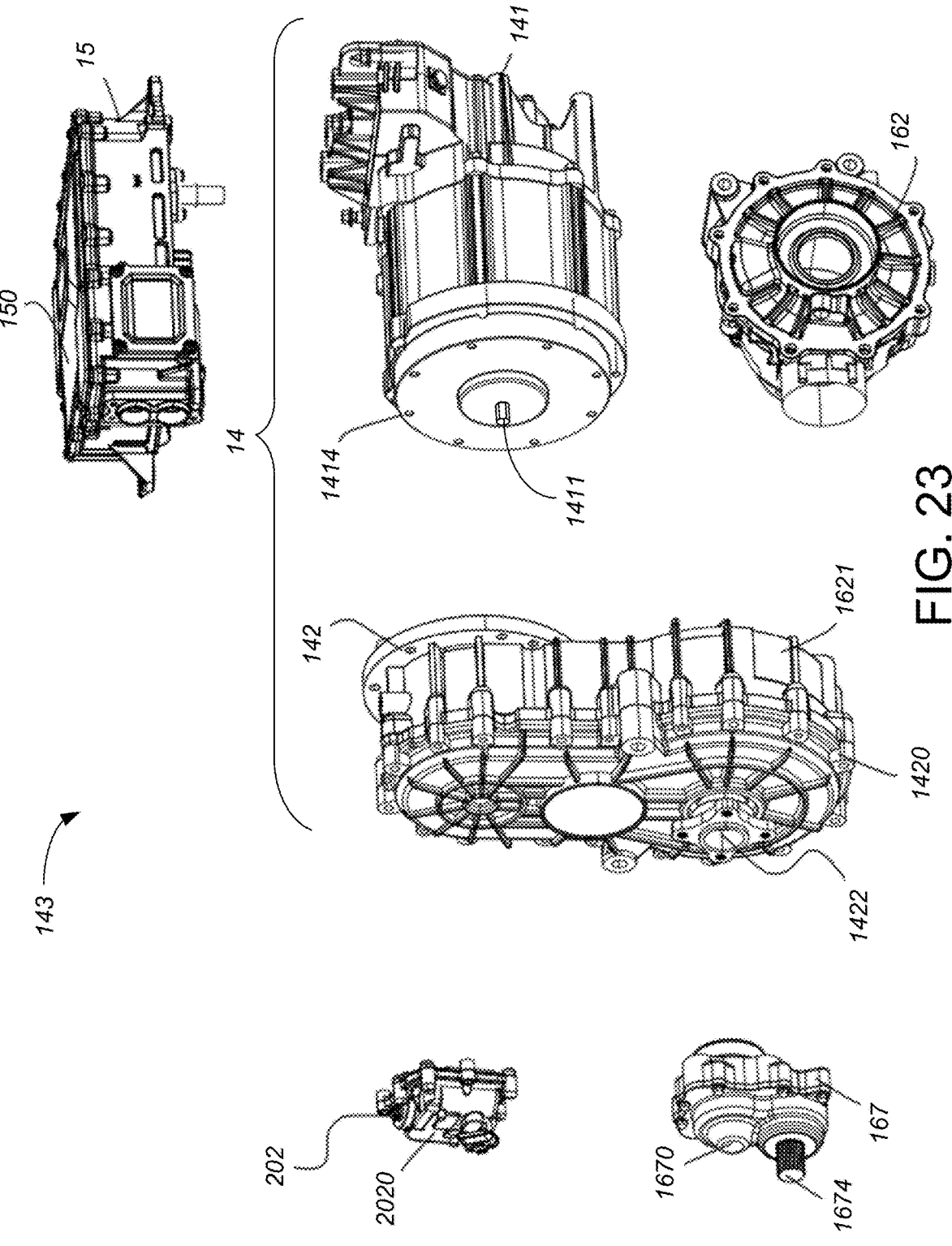
FIG. 23 is an exploded front left perspective view of the prime mover assembly of FIG. 22.

FIGS. 2 and 3 omit the vehicle cover 12 (other than the seat cushion 121) and the set of wheels 13 of the ATV 100, to better show the frame 11 as well as a drive system 14, an electronic motor control unit (MCU) 15, a drive train 16, a battery pack 17, and the front and rear suspensions 191, 192 of the ATV 100. FIG. 4 simplifies by omitting the seat cushion 121 and various other components. FIG. 6 further simplifies by showing only the drive system 14, the electronic motor control unit (MCU) 15, the drive train 16, and the battery pack 17 relative to only portions of the frame 11, showing schematic views of the set of wheels 13. The drive system 14, the MCU 15 and the drive train 16 are directly or indirectly mounted on the frame 11. The battery pack 17 is supported by the frame 11, preferably at a middle location where the battery pack 17 can be straddled by a rider sitting on the seat cushion 121. The drive system 14 includes an electric motor 141 and a gearbox assembly 142. The battery pack 17 is electrically connected to the electric motor 141 of the drive system 14 to provide electric energy for the electric motor 141. The gearbox assembly 142 connects an output shaft 1411 (best shown in FIG. 23) of the electric motor 141 to the drive train 16. The vehicle cover 12 is at least partially mounted on the frame 11 to protect the drive system 14, the drive train 16, and the battery pack 17 as well as to make the ATV 100 more aesthetically appealing. The MCU 15 is electrically connected to the electric motor 141, and is primarily for controlling an operation status of electric motor 141.

The frame 11 includes a base 110, a first, front frame assembly 111 extending upwardly from the base 110 in front of the battery pack 17, and a second, rear frame assembly 112 extending upwardly from the base 110 behind the battery pack 17. The drive system 14 and the MCU 15 are preferably mounted to the rear frame assembly 112 rearward of the battery pack 17, and at least partially behind the battery pack 17.

The battery pack 17, the electric motor 141 and the MCU 15 are collectively referred to as the "Tri-core system" of the ATV 100. The side view of FIG. 4 and associated rear view of FIG. 5 call out several dimensions associated with the preferred Tri-core layout of the present invention. As shown in FIGS. 4 and 5, the battery pack 17 has a battery pack height H1, the drive system 14 has a drive system height H2, the MCU 15 has an MCU height H3, and the overall Tri-core system has a Tri-core system height H4. At least two of the battery pack height H1, drive system height H2 and MCU height H3 overlap in overlap heights OH. The ratio OH/H4 of the sum of overlap heights OH to the Tri-core system height H4 is in the range from 0.4 to 1.0, with a preferred value of about 0.7. Similarly, the rear view of FIG. 5 effectively shows projections of the battery pack 17, the MCU 15 and the electric motor 141 on a vertical transverse plane perpendicular to the longitudinal direction. The three projections collectively define a Tri-core system projection area A1 (any of the cross-hatching), and any two or more of the projections which overlap define a projection overlap area A2 (with an "X" cross-hatch pattern). A ratio A2/A1 of the projection overlap area A2 to the Tri-core system projection area A1 to is preferably in the range from 0.4 to 1.0, with a preferred value of about 0.7.

Locating the MCU 15 over the electric motor 141 allows for an accommodation space to be defined between the drive system 14 and the battery pack 17. An under-seat storage box 122 may be arranged in this accommodation space, which further increases the storage space of the electric ATV 100.

Figure 7:
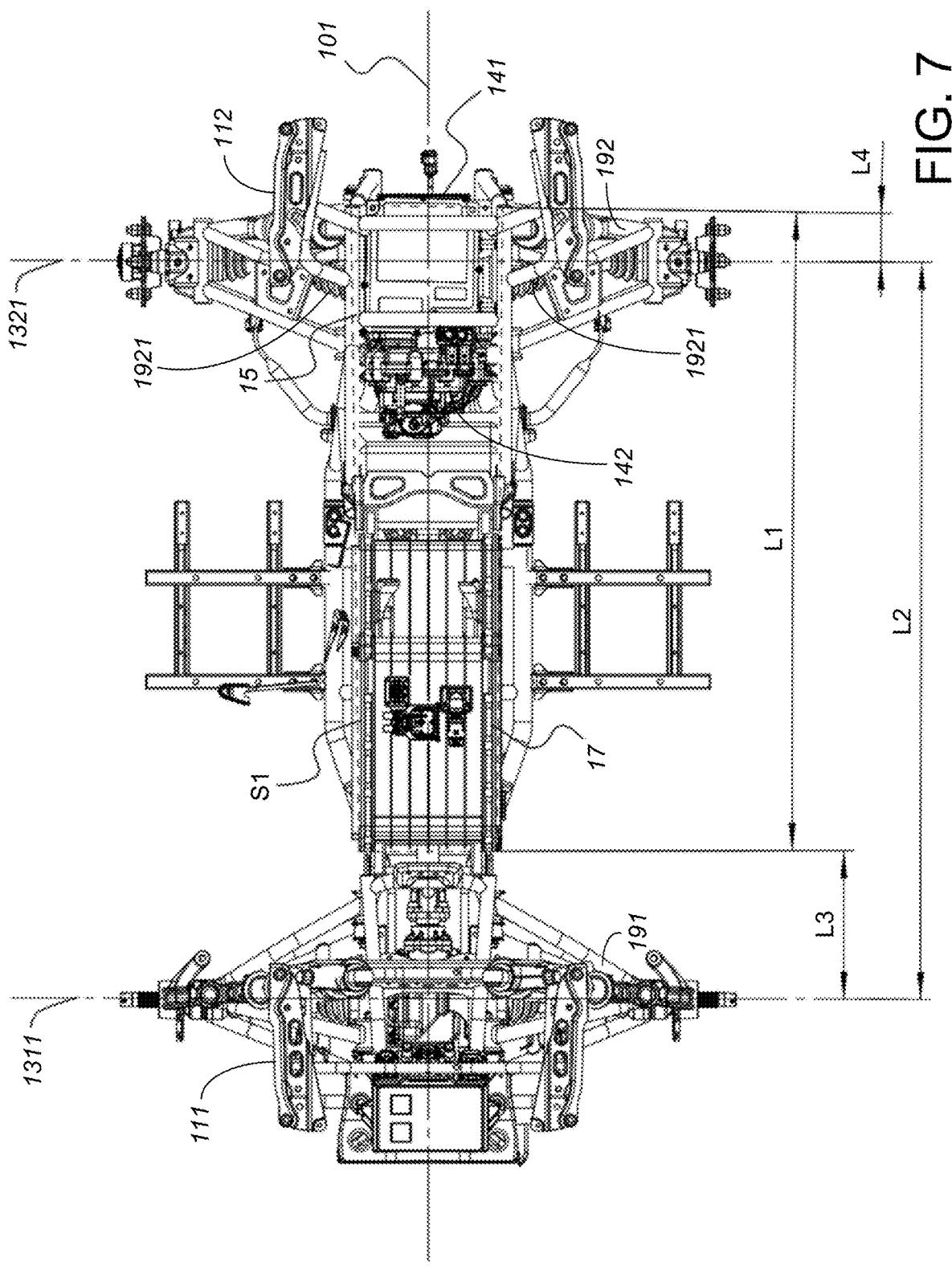
FIG. 7 is a top plan view of the frame, Tri-core system, drive train and suspension of FIG. 4.

The plan view of FIG. 7 calls out several further dimensions associated with the preferred Tri-core layout of the present invention. A front wheel axis centerline 1311 is defined as a straight line connecting the two rotation center points of the two front wheels 131, and a rear wheel axis 1321 is defined as a straight line connecting the two rotation center points of the two rear wheels 132. A Tri-core system projection area S1 is defined as the combined projections of the MCU 15, electric motor 141 and battery pack 17 all on a horizontal plane as viewed in FIG. 7. A maximum longitudinal length occupied by the Tri-core system projection area S1 is defined as a Tri-core length L1. In the preferred layout, the MCU 15 is at least partially positioned above the electric motor 141, which can shorten the Tri-core length L1. The electric motor 141 and the MCU 15 are preferably directly mounted on the rear frame assembly 112, but an alternative embodiment mounts the MCU 15 directly on the electric motor 141, which can make the connection between the electric motor 141 and the MCU 15 closer, save assembly space of the electric ATV 100, and further reduce the length of wire harness connections between various electrical components, thereby reducing assembly costs and material costs.

A horizontal longitudinal length between the front wheel axis centerline 1311 and the rear wheel axis 1321 is defined as a wheelbase distance L2. A ratio L2/L1 of the wheelbase distance L2 to the Tri-core length L1 is preferably in the range from 0.7 to 2.5, more preferably in the range from 0.9 to 2.0, and most preferably in the range from 1.1 to 1.6. This allows the weights of the MCU 15, the electric motor 141, and the battery pack 17 of the electric ATV 100 to be evenly distributed along the length of the electric ATV 100, which is conducive to the reasonable distribution of the center of gravity of the electric ATV 100. A longitudinal mid-plane 101 is defined perpendicular to a left-right direction of the electric ATV 100, and the electric ATV 100 is substantially symmetrical with respect to the longitudinal mid-plane 101. The longitudinal mid-plane 101 at least partially intersects with the Tri-core system projection area S1. Preferably, the Tri-core system projection area S1 is substantially symmetrical with respect to the longitudinal mid-plane 101, with the weight and volume distribution of each of the battery pack 17, the electric motor 141, and the MCU 15 of the electric ATV 100 being substantially evenly distributed on the left and right sides of the electric ATV 100. This contributes to locating the center of gravity of the electric ATV 100 substantially at the center position of the electric ATV 100, thereby making the electric ATV 100 more stable during running.

A longitudinal length from the front edge of the Tri-core system projection area S1 to the front wheel axis centerline 1311 is defined as a Tri-core front distance L3. The Tri-core front distance L3 is preferably in the range from 0 mm to 1500 mm, more preferably the range from 100 mm to 1000 mm, and most preferably in the range from 200 mm to 500 mm. A longitudinal length from the rear edge of the Tri-core system projection area S1 to the rear wheel axis 1321 is defined as a Tri-core rear distance L4. The Tri-core rear distance LA is preferably in the range from 0 mm to 1500 mm, more preferably in the range from 0 mm to 1000 mm, and most preferably in the range from 0 mm to 500 mm. Appropriate selections of values for the Tri-core front distance L3 and the Tri-core rear distance L4 helps position the battery pack 17, the electric motor 141, and the MCU 15 so the center of gravity of the ATV 100 is not too far forward or backward, ensuring the stability and handling of the electric ATV 100.

Figure 9:
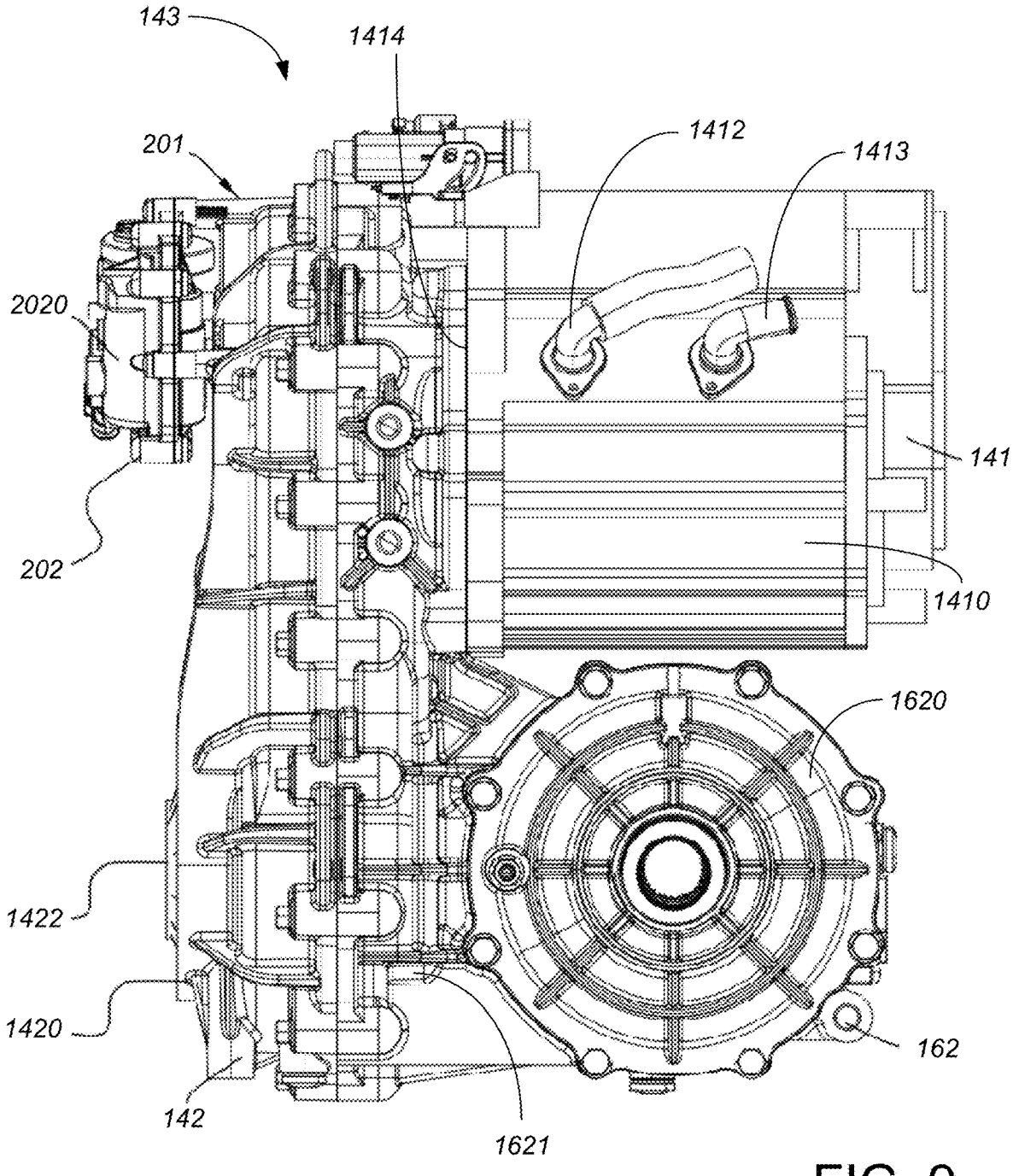
FIG. 9 is a left side view of the prime mover assembly of FIGS. 4 and 8, omitting the MCU cover.
Figure 10:
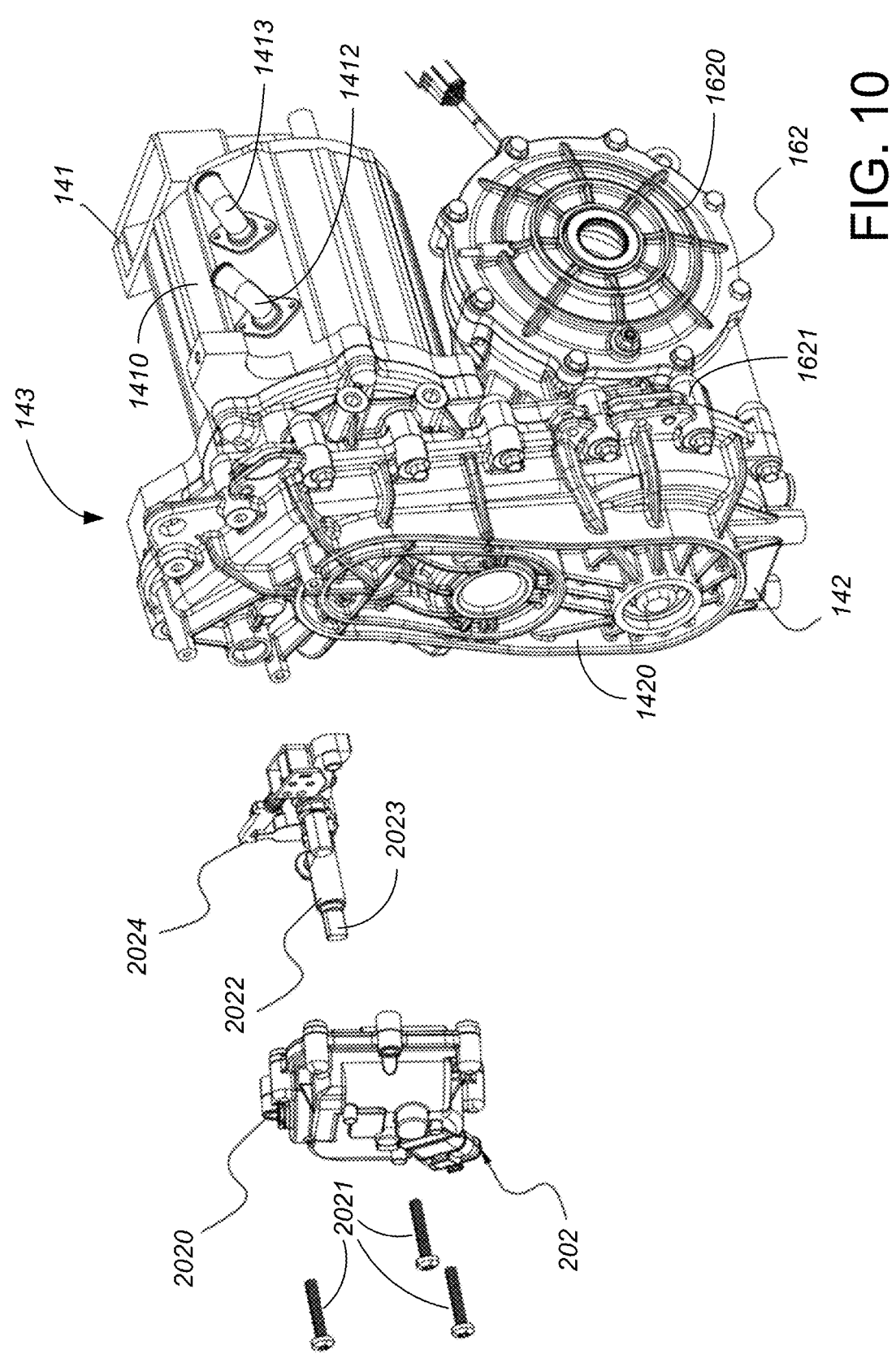
FIG. 10 is a front left perspective view of the prime mover assembly of FIGS. 4, 8 and 9, showing the engine parking brake in exploded view.

The preferred electric motor 141 is liquid cooled, including a coolant inlet 1412 and a coolant outlet 1413 on a motor coolant housing 1410 as better shown in FIGS. 9 and 10. Coolant for cooling the electric motor 141 is circulated within the motor coolant housing 1410, thereby facilitating continuous cooling of the electric motor 141.

Figure 12:
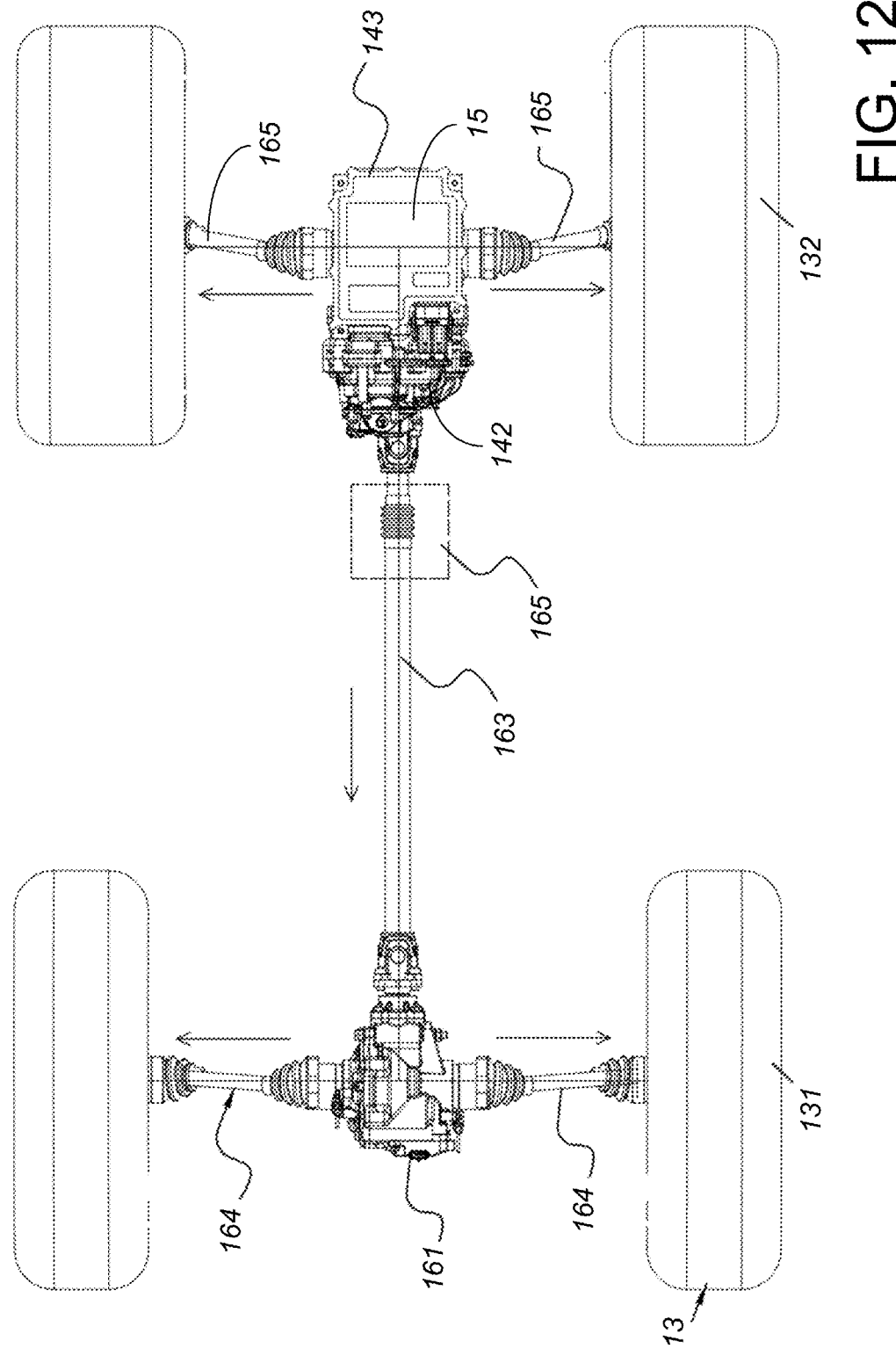
FIG. 12 is a top plan view of the prime mover assembly and drive train of FIGS. 4 and 11, schematically showing the set of wheels.
Figure 13:
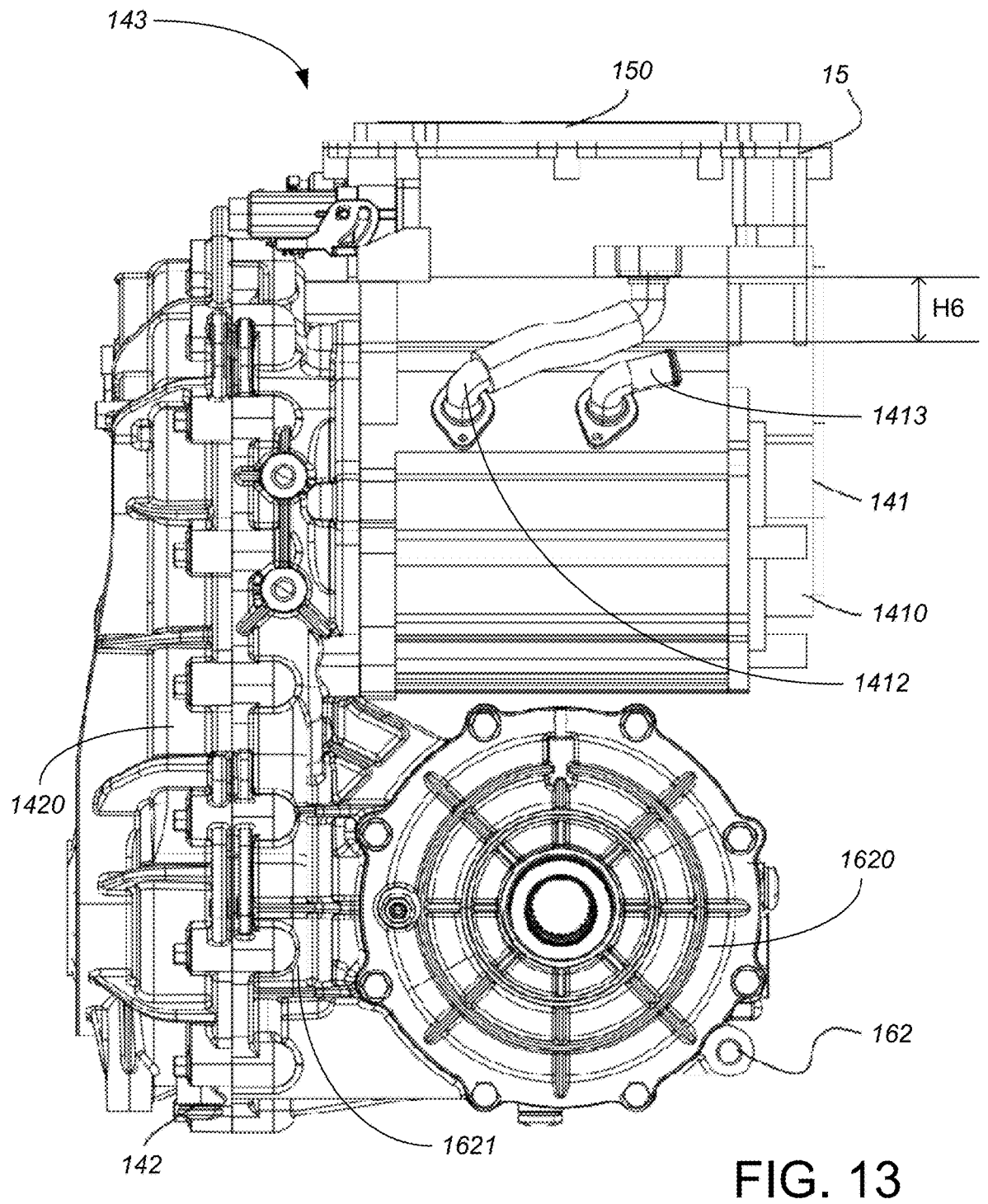
FIG. 13 is a left side view of the prime mover assembly of FIG. 9, omitting the engine parking brake and adding the MCU cover.

The drive train 16 includes a front differential 161 and a rear differential 162 well shown in FIG. 3, a drive shaft 163 best shown in FIG. 4, and front and rear half shafts 164, 165 best shown in FIG. 12. To accommodate for the desired position and layout of the drive train 16 in this embodiment, the battery pack 17 is supported well above the frame base 110, such as 50 mm or more, by stand-offs 113 called out in FIGS. 3 and 4.

The drive system 14 further includes a gearbox assembly 142. In the embodiment of FIGS. 3-16, the gearbox assembly 142 is at least partially positioned between the battery pack 17 and the electric motor 141. Positioning the gearbox assembly 142 close to the MCU 15 can make a high-voltage wiring harness (not shown) connected between the MCU 15, the battery pack 17, and the electric motor 141 shorter, thereby reduce the mounting difficulty and cost of the electric ATV 100. As called out in FIGS. 15 and 16, the gearbox assembly 142 has a gearbox input axis 1421 and a gearbox output axis 1422. The gearbox assembly 142 is equipped with gears (preferably as shown in FIG. 16) transmitting power from the gearbox input axis 1421 to the gearbox output axis 1422. The drive shaft 163 is connected to the motor 141 in a transmission mode by means of the gears in the gearbox assembly 142.

In the preferred embodiment, the drive system 14 (including the electric motor 141 and the gearbox assembly 142), the MCU 15 and the rear differential 162 are all jointly preassembled as a prime mover assembly 143. In the prime mover assembly 143, the electric motor 141 is positioned such that a motor output end face 1414 is adjacent to or in contact with the gearbox assembly 142, preferably perpendicular to the gearbox input axis 1421. The prime mover assembly 143 is preferably mounted in the vehicle 100 such that the gearbox input and output axes 1421, 1422 extend in the longitudinal direction, perpendicular to the front wheel axis centerline 1311 and perpendicular to the rear wheel axis 1321, which places the motor output end face 1414 substantially parallel to the rear wheel axis 1321. The preferred layout places the motor output end face 1414 in front of the rear wheel axis 1321. The preferred layout still positions the prime mover assembly 143 at least partially between the two rear shock absorbers 1921 of the rear suspension 192, such that the rear shock absorbers 1921 at least partially overlap with the prime mover assembly 143 in side view as best shown in FIG. 8.

Figure 8:
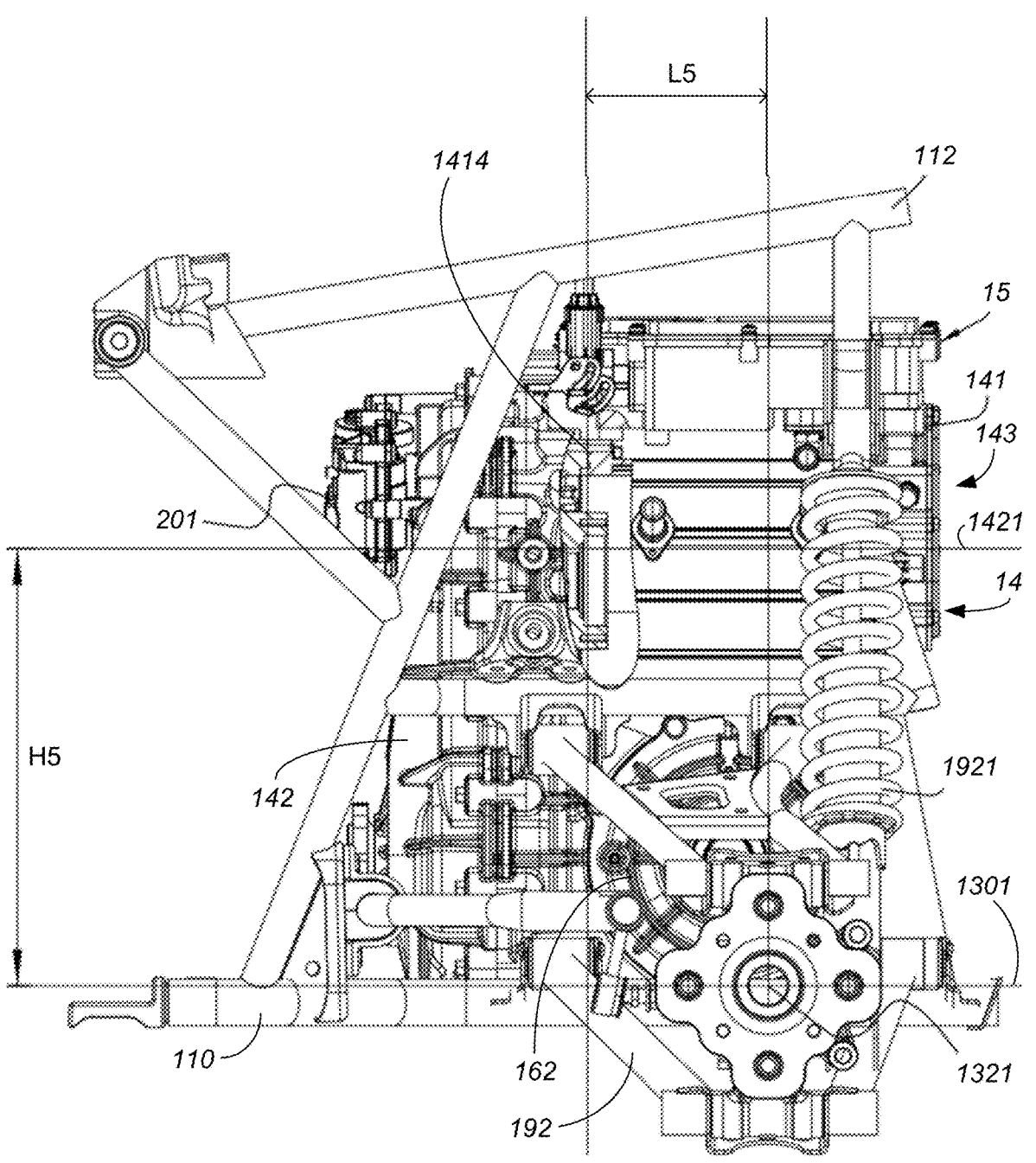
FIG. 8 is a left side view of the prime mover assembly, rear frame portion and rear suspension of FIG. 4.

A motor face placement length L5 is defined longitudinally between the motor output end face 1414 and the rear wheel axis 1321 as called out in FIG. 8. The motor face placement length L5 is preferably in the range from 0 mm to 400 mm, and more preferably in the range from 50 mm to 200 mm, effectively controlling the output position of the driving force (torque) of the electric ATV 100 and providing more sufficient assembly space for the front end of the electric ATV 100. A wheel axis plane 1301 is defined as a plane containing the front wheel axis centerline 1311 and the rear wheel axis 1321. The preferred layout also places the gearbox input axis 1421 above the wheel axis plane 1301, defining a gearbox input height H5 vertically of the gearbox input axis 1421 above the wheel axis plane 1301. The gearbox input height H5 is preferably in the range from 50 mm to 900 mm and more preferably in the range from 100 mm to 500 mm, effectively lowering the center of gravity of the electric ATV 100. When the electric ATV 100 is rear-wheel-drive or four-wheel-drive, a low value for the gearbox input height H5 reduces the distance between the prime mover assembly 143 and the driven rear wheels 132, which can effectively reduce costs.

As best shown in FIGS. 9 and 10, the electric ATV 100 preferably includes an engine parking brake 201 packaged as part of the prime mover assembly 143. The engine parking brake 201 includes a brake execution module 202, preferably engaged by the user pressing a parking button (not shown) and under control of the MCU 15. That is, the control function of the engine parking brake 201 and the control of the electric motor 141 are both integrated into the MCU 15, such that the MCU 15 acts as both a motor control unit and a vehicle control unit ("VCU"). The parking button is electrically connected to the VCU/MCU 15, which in turn is electrically connected to the parking execution module 202. When the driver presses the parking button, the VCU/ MCU 15 sends an electrical signal to the parking execution module 202 to execute the parking operation.

The parking execution module 202 is preferably mounted on the side of the gearbox assembly 142 away from the electric motor 141 and away from the rear differential 162, above the drive train 16. As shown in FIG. 10, the brake execution module 202 preferably includes an engine parking brake housing 2020 mounted on a housing 1420 of the gearbox assembly 142 such as by bolts 2021. The engine parking brake housing 2020 contains an engine parking brake solenoid 2022 driving a parking brake shaft 2023, with a parking brake caliper 2024 on the distal end of the parking brake shaft 2023. When driven to an engaged position by the engine parking brake solenoid 2022 moving the parking brake shaft 2023, the parking brake caliper 2024 can lock with a gear in the gearbox assembly 142, achieving the parking brake function. The parking execution module 202 is mounted such that the parking brake shaft 2023 and the parking brake caliper 2024 can at least partially extend into the gearbox housing 1420.

Figure 11:
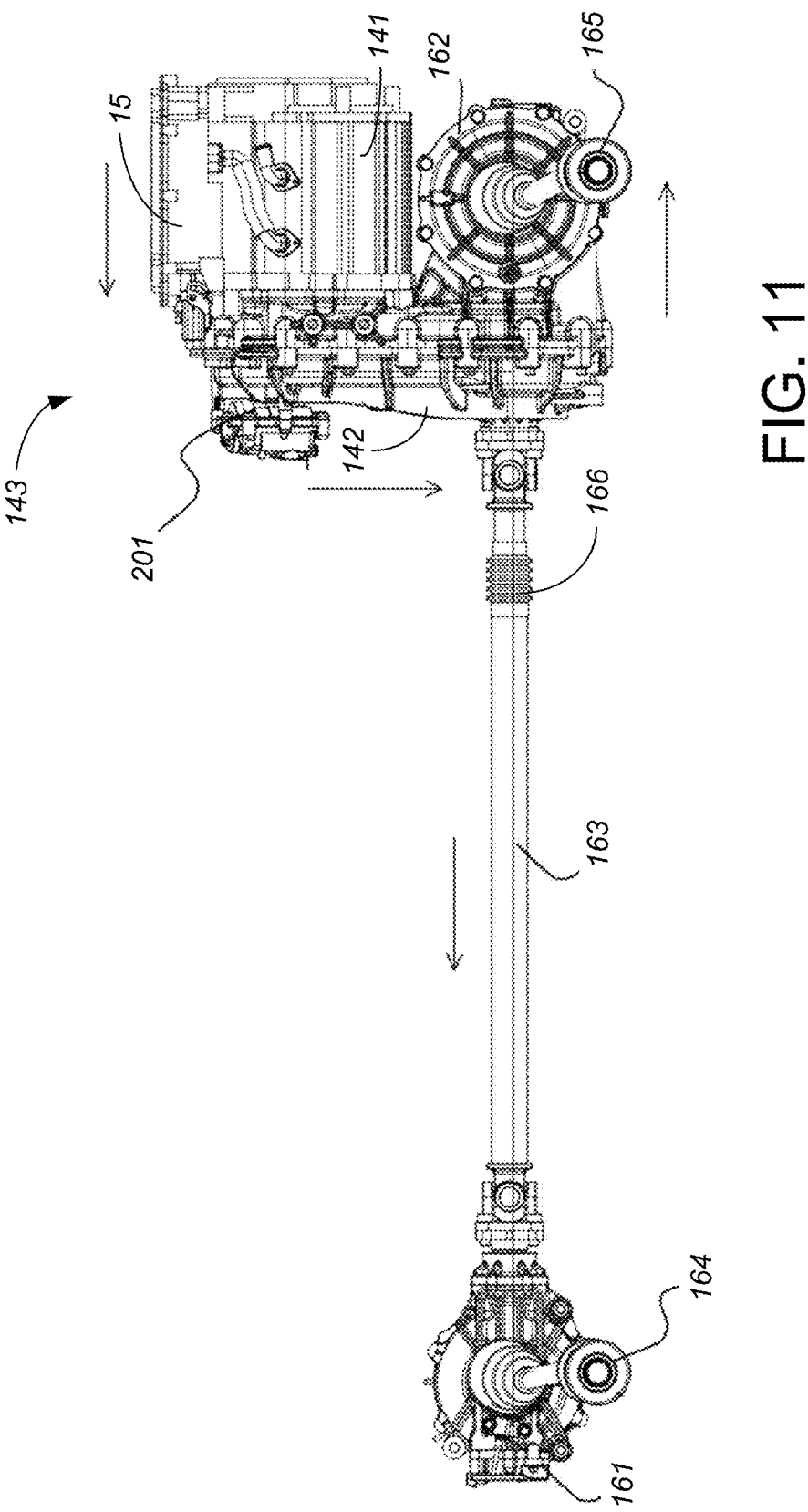
FIG. 11 is a left side view of the prime mover assembly and drive train of FIG. 4.
Figure 15:
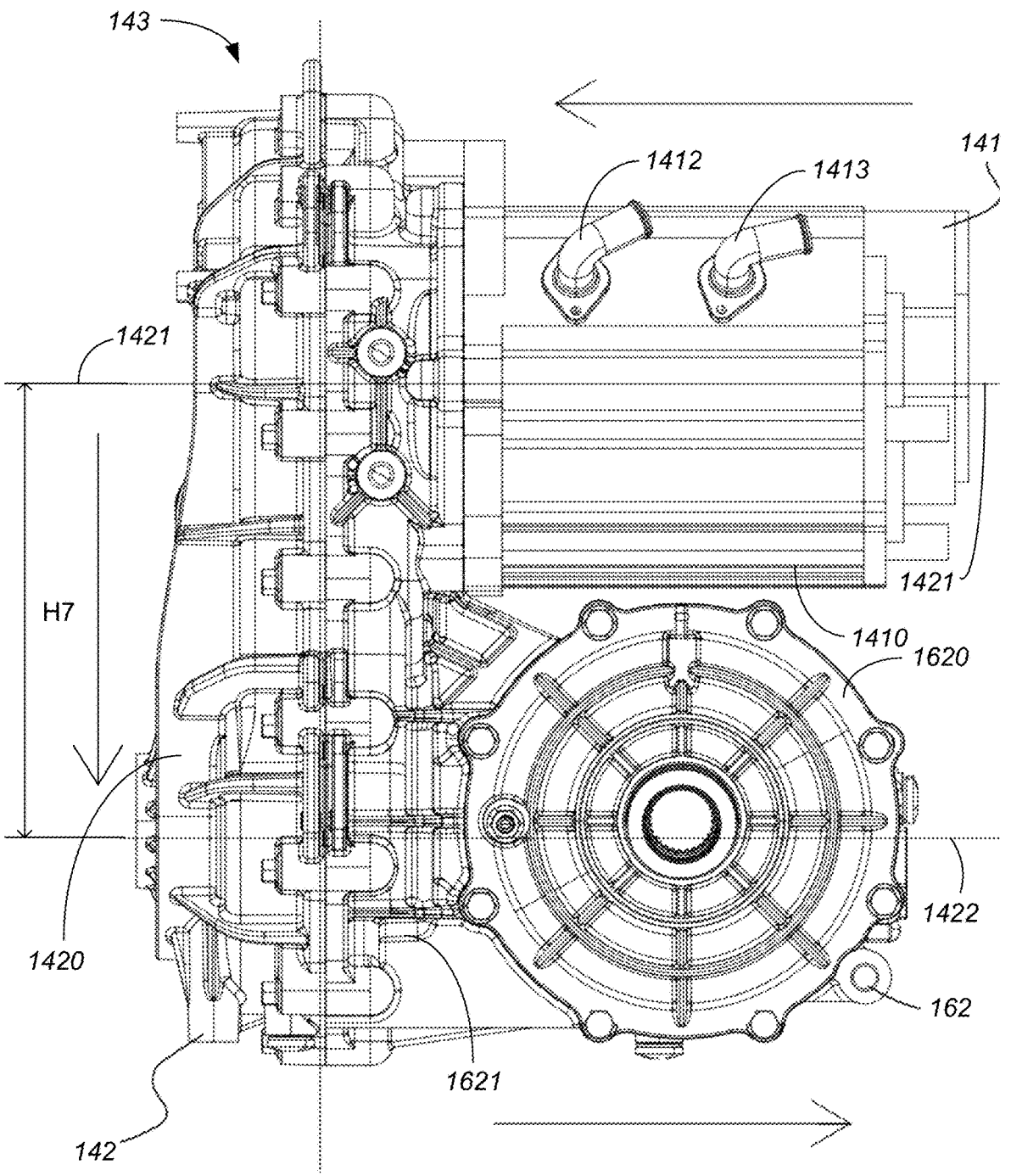
FIG. 15 is a left side view of the prime mover assembly of FIGS. 4, 8-10, 13 and 14, omitting the engine parking brake and MCU.
Figure 16:
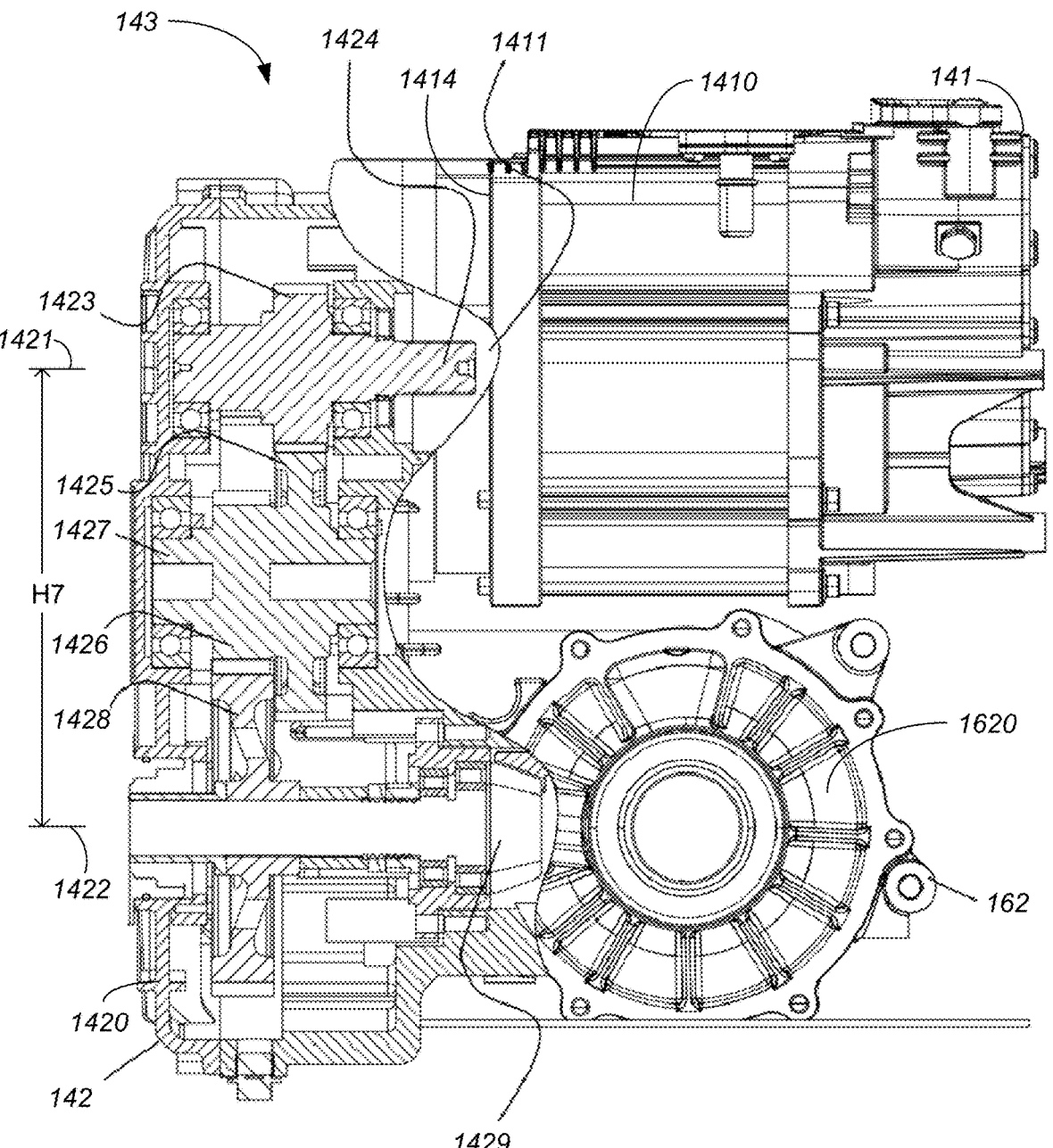
FIG. 16 is a left side view of the prime mover assembly of FIGS. 4, 8-10 and 13-15, omitting the engine parking brake and MCU, and showing the gearbox assembly in cross-section at the longitudinal mid-plane.

FIGS. 11, 12 and 15 show arrows indicating the direction of driving force/torque for the electric ATV 100. Torque is generated by the drive system 14 and ultimately transmitted to the set of wheels 13 of the electric ATV 100, thereby providing for movement or locomotion of the electric ATV 100. The torque originates in the electric motor 141, with the torque being transferred, preferably forwardly, to the gearbox assembly 142. The gearbox assembly 142 transfers the driving force/torque downwardly, where it splits into a first/rear transmission path and a second/front transmission path. Part of the driving torque moves rearwardly to the rear differential 162. The rear differential 162 transfers the driving torque to right and left rear wheels 132 via rear half shafts 165. At least while in four-wheel drive mode, another part of the driving torque is transferred forwardly from the gearbox assembly 142 to the drive shaft 163. The torque moves forwardly via the drive shaft 163 to the front differential 162. The front differential 161 transfers the driving torque to right and left front wheels 131 via front half shafts 164. When the electric motor 141, the gearbox assembly 142, and the rear differential 162 are highly integrated into the prime mover assembly 143, the route range particularly of the first, rear transmission path can be made as short as possible.

The drive train 16 of the electric ATV 100 further includes a connection mechanism such as a transfer case 166. The transfer case 166 is mounted in the drive train 16 as part of either the rear transmission path or the front transmission path. In the preferred embodiment, the transfer case 166 is arranged between the drive system 14 and the drive shaft 163, such as by being connected to the drive system 14 and the drive shaft 163 by splines, and is therefore part of the front transmission path. The transfer case 166 allows selected interruption or continuation of driving torque transmission between the drive system 14 and the drive shaft 163. A control switch (not shown) for the transfer case 166 is positioned on the electric ATV 100 so as to be operable by the driver. The control switch is electrically connected to the transfer case 166, allowing driver control as to whether the ATV 100 is in four-wheel drive mode or two-wheel (rear-wheel) drive mode. When the transfer case 166 interrupts torque transmission, the drive shaft 163 does not rotate, thereby effectively reducing frictional energy losses. Placing the connection mechanism 166 between the drive system 14 and the drive shaft 163 helps lower assembly and maintenance costs of the electric ATV 100. Alternatively, the connection mechanism could be arranged between one of the differentials 191, 192 and its associated half shafts 164, 165. The connection mechanism 166 is always on either the front transmission path or the rear transmission path.

FIGS. 13-16 show the preferred prime mover assembly 143 without the engine parking brake 201. As called out in FIG. 13, a gap distance H6 is preferably defined between a housing 150 of the MCU 15 and the motor coolant housing 1410 of the electric motor 141. The gap distance H6 allows increased heat dissipation efficiency. When the gap distance H6 is too small, heat from the electric motor 141 is easily convected and/or conducted to the MCU 15. A small gap distance H6 can also allow electromagnetic interference generated in the electric motor 141 to affect performance of the MCU 15. If the gap distance H6 is too large, it will cause the prime mover assembly 143 to occupy too much volume, thereby affecting the layout of the entire ATV 100. The gap distance H6 is preferably in the range from 0 to 80 mm. Regardless of the gap distance H6 as designed, the MCU 15 is preferably fixedly connected directly to the electric motor 141.

Figure 14:
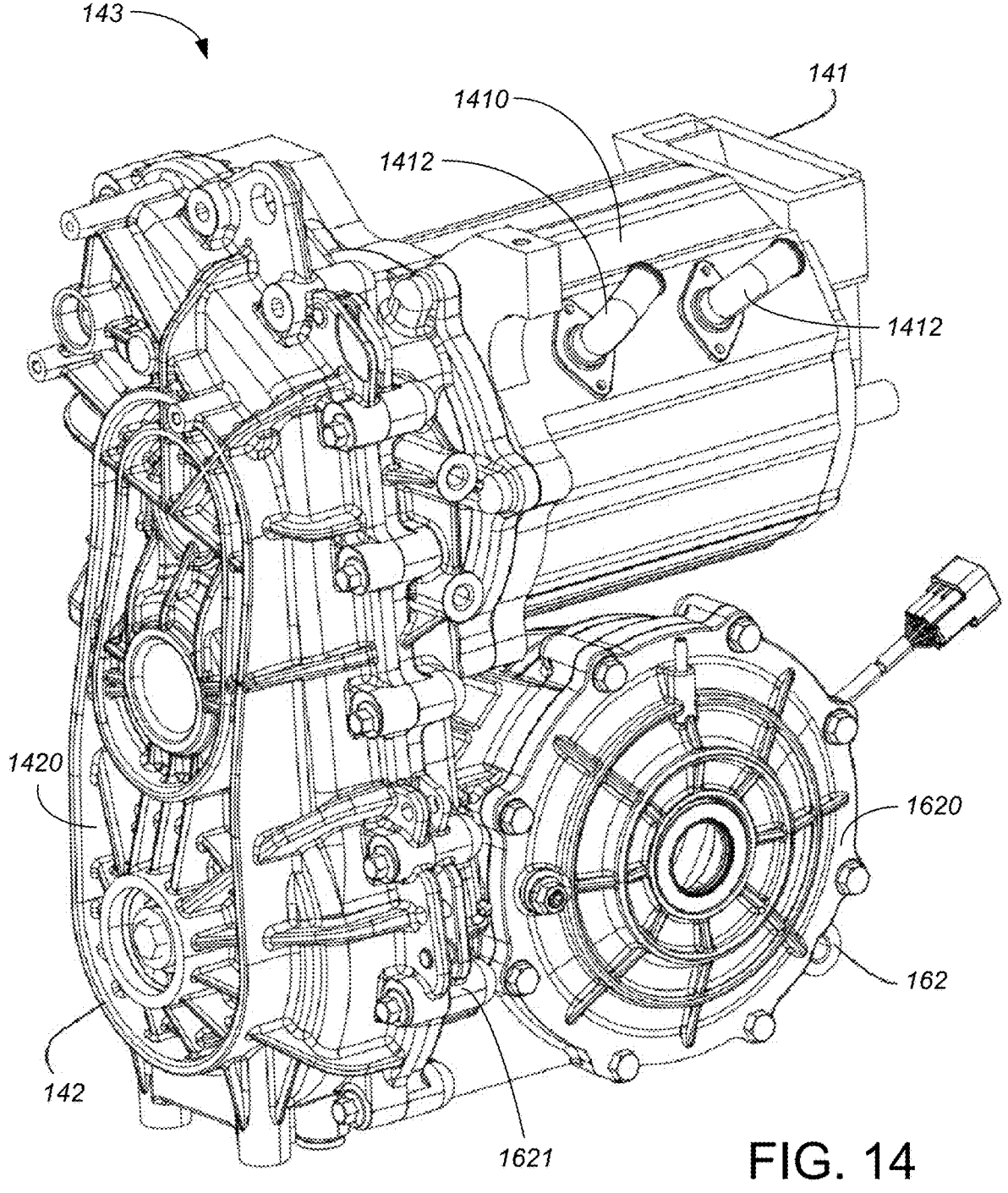
FIG. 14 is a front left perspective view of the prime mover assembly of FIGS. 4, 8-10 and 13, omitting the engine parking brake and MCU.

FIGS. 14-16 omit the MCU 15 as well as the engine parking brake 201 from the prime mover assembly 143, with FIG. 16 showing the preferred gearbox assembly 142 in cross-section taken along its center line and the longitudinal mid-plane 101 of the electric ATV 100. The preferred gearbox assembly 142 includes an input gear 1423 on an input gear shaft 1424, two intermediate gears 1425, 1426 on an intermediate gear shaft 1427 and an output gear 1428 on an output gear shaft 1429. The input gear 1423 is meshed with the large diameter intermediate gear 1425, and the small diameter intermediate gear 1426 is meshed with the output gear 1428, both to increase torque and reduce rotational speed from the electric motor output shaft 1411. The electric motor output shaft 1411 can have a splined connection to the input gear shaft 1424. The three gear shafts 1424, 1427, 1429 are preferably arranged vertically, so as to define a gearbox offset distance H7 between the gearbox input axis 1421 and the gearbox output axis 1422. The gearbox offset distance H7 is preferably in the range from 50 mm to 600 mm, and more preferably in the range from 100 mm to 300 mm. A small gearbox offset distance H7 can make the prime mover assembly 143 occupy less vertical space, further enhancing the integration and compactness of the prime mover assembly 143. The appropriate reduction ratios can be determined by reasonably choosing the number teeth on the gears 1423, 1425, 1426, 1428, such as having the first gear set 1423, 1425 providing a gear reduction in the range from 1 to 3, and having the second gear set 1426, 1428 providing a gear reduction in the range from 1.5 to 2.5. Correspondingly, the total reduction ratio of the gearbox assembly 142 is in the range from 3 to 4.5, and a ratio of a rotational speed of the gearbox input shaft 1424 to a rotational speed of the gearbox output shaft 1429 is in the range from 3 to 4.5. Most preferably, the reduction ratio of the gearbox assembly 142 is 3.9. Alternative embodiments use a different number of gearbox shafts other than three, such as two or four, to result in a different reduction ratio.

In the preferred layout, the parking execution module 202 is mounted on the smallest width portion of the gearbox housing 1420 adjacent the input gear 1423, thereby effectively controlling the total volume and compactness of the prime mover assembly 143. The distance between the VCU/MCU 15 and the parking execution module 202 is kept short, further increasing the compactness of the prime mover assembly 143. The parking execution module 202 may alternatively be arranged on other locations on the gearbox housing 1420, and the parking brake caliper 2024 may lock or disengage from any of the gearbox input shaft 1424, the intermediate gearbox shaft 1427, the gearbox output shaft 1429, and the motor output shaft 1411. In other embodiments, the parking execution module 202 may alternatively be arranged in one of the differentials 161, 162 or on the drive shaft 163, which are within the scope of protection of the present invention as long as the engine parking brake function and high integration/compactness of prime mover assembly 143 are realized.

Figure 17:
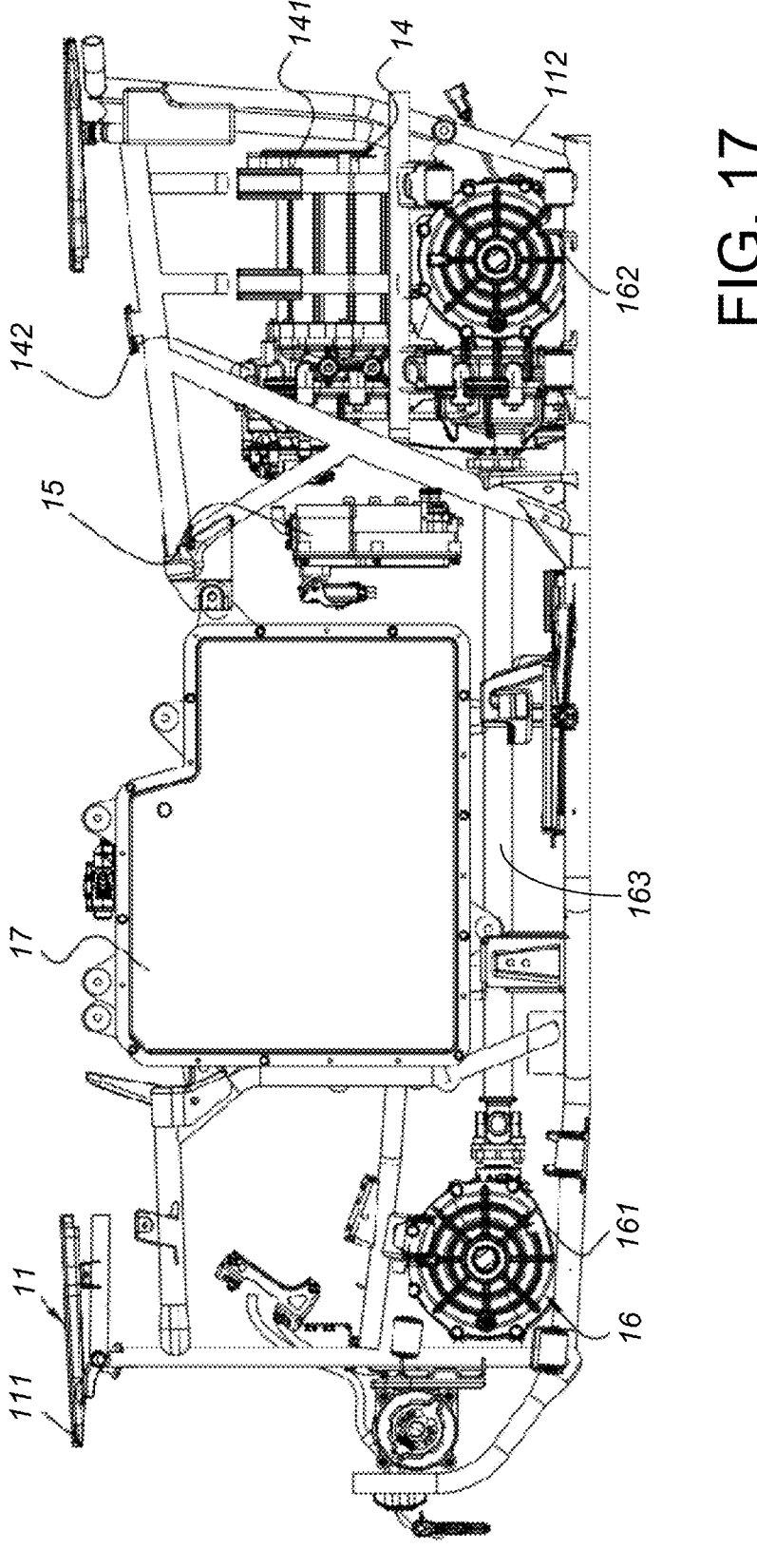
FIG. 17 is a left side view of the frame, drive train and suspension of FIG. 4, showing an alternative placement of the MCU.

FIG. 17 shows a side view of an alternative embodiment in which the MCU 15 is positioned between the electric motor 141 and the battery pack 17, such that from front to rear, the battery pack 17, the MCU 15, and the electric motor 141 are mounted in sequence. The gearbox assembly 142 is at least partially positioned between the electric motor 141 and the MCU 15. The MCU 15 is rotated relative to its orientation in the embodiments of FIGS. 3-16, such that the MCU 15 is mounted with its shortest side length extending in the longitudinal direction. When the MCU 15 is positioned between the electric motor 141 and the battery pack 17, reorienting the MCU 15 shortens the length of the Tri-core system projection area. Furthermore, the battery pack 17 and the MCU 15 are positioned longitudinally between the front differential 161 and the rear differential 162, and the electric motor 141 is at least partially placed above the rear differential 162. This achieves a relatively short length of the Tri-core system projection area, but also fully utilizes the vehicle space, thereby making the ATV more compact as a whole. The MCU 15 could alternatively be located rearward of the electric motor 141, such that the electric motor 141 is between the MCU 15 and the battery pack 17. The MCU 15 may be fixedly connected directly to the frame 11. For the embodiment of FIG. 17, another alternative is to fixedly connect the MCU 15 directly to the battery pack 17. The relatively large height and width of the battery pack 17 provides the possibility for the direct fixation of the MCU 15 thereto. In an electric ATV with a shorter battery pack, the MCU 15 may alternatively be at least partially mounted on the upper end of battery pack 17.

Figure 18:
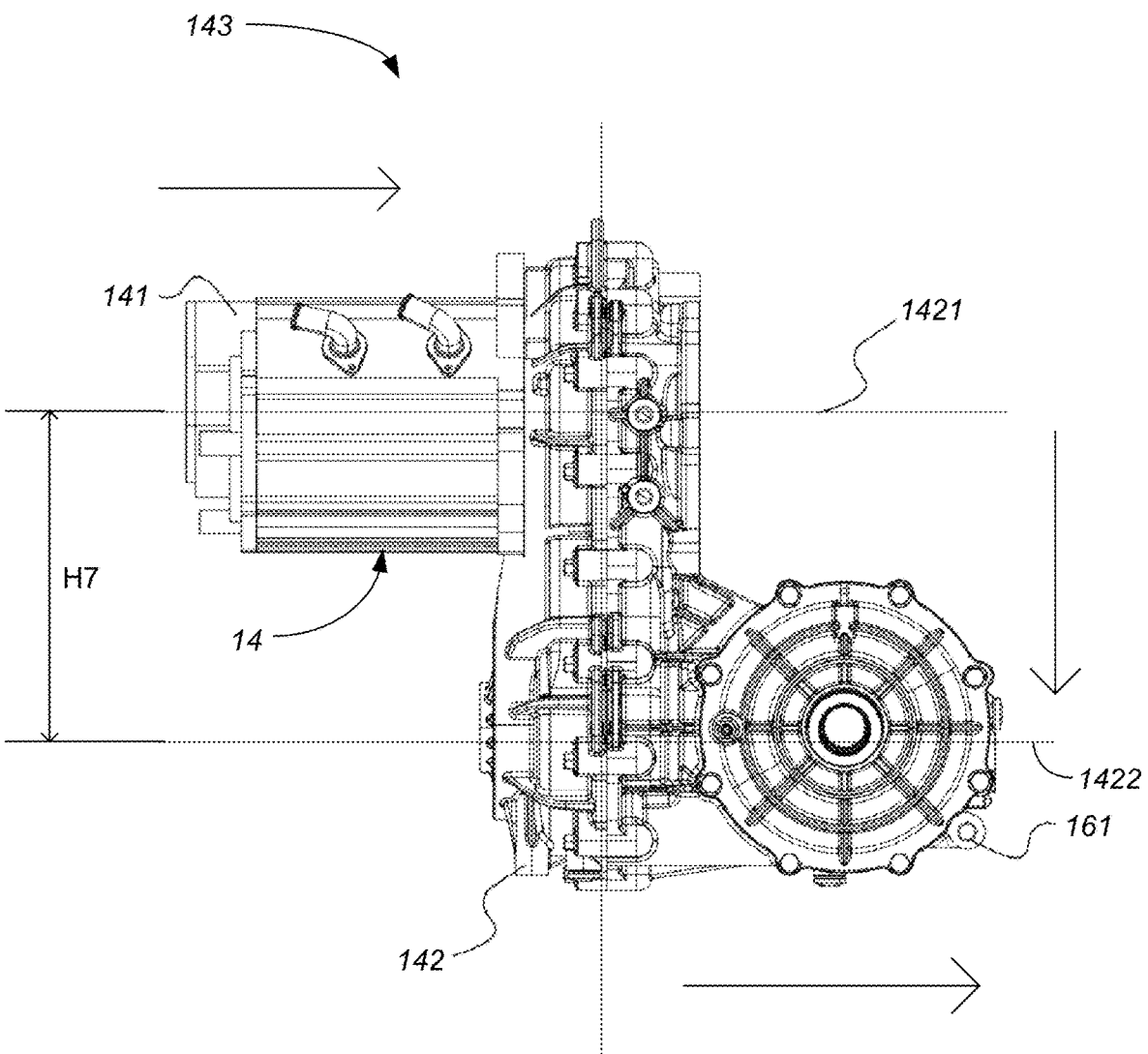
FIG. 18 is a left side view of an alternative prime mover system layout.
Figure 19:
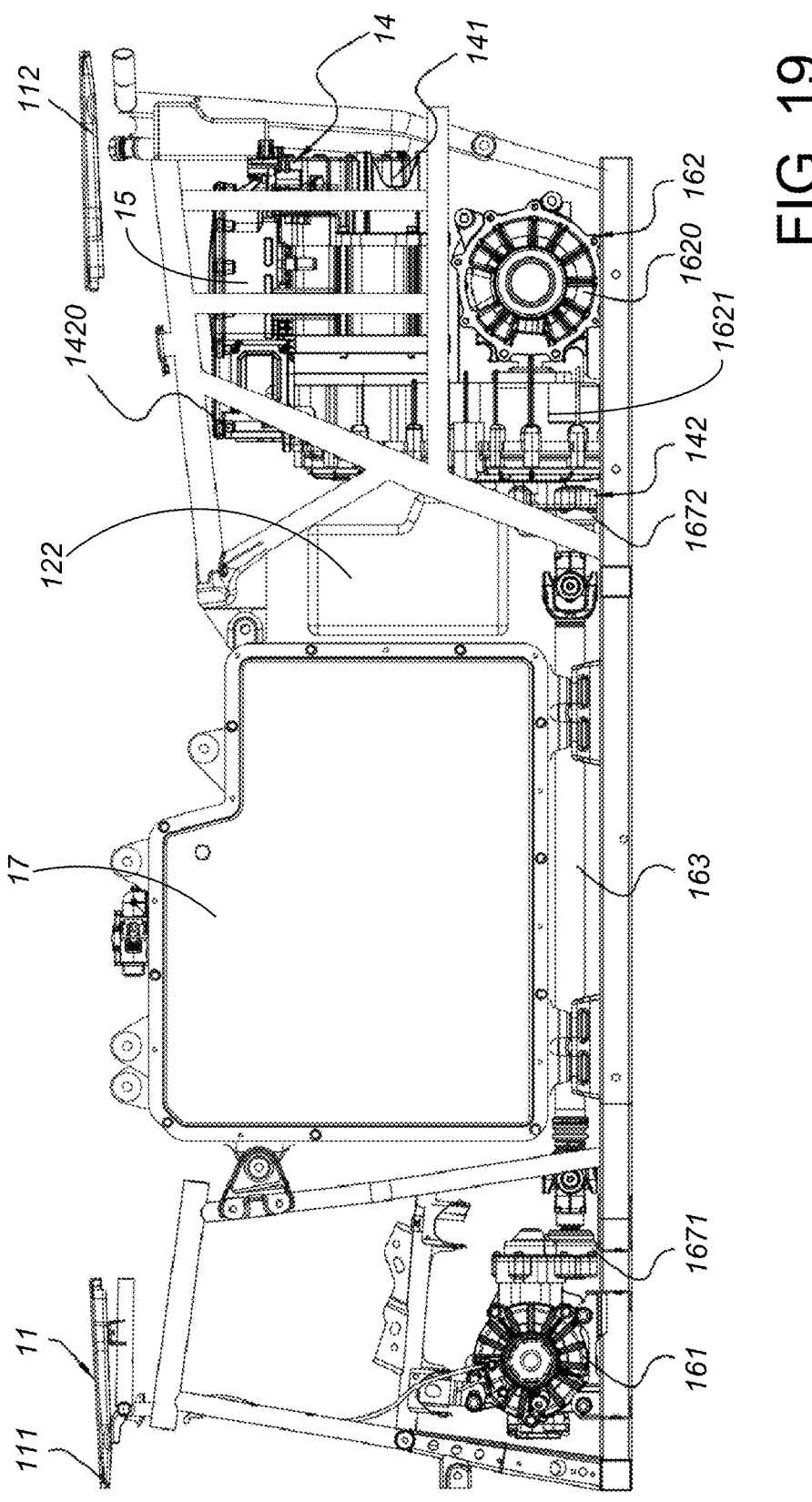
FIG. 19 is a left side view of an alternative frame and drive train, using the Tri-core system of FIG. 4 and adding drive train offsets.

The preferred embodiments of FIGS. 1-17 have a prime mover assembly 143 with the electric motor 141 and the rear differential 162 on the same side of the gearbox assembly 142. For most vehicle layouts, this makes the prime mover assembly 143 more compact, with a more regular shape and simpler assembly due to the relatively equal length of the electric motor 141 and rear differential 162. FIG. 18 shows an alternative embodiment in which the electric motor 141 is mounted on the opposite side of the gearbox assembly 142 than the rear differential 162. Mounting the electric motor 141 and the rear differential 162 on opposite sides of the gearbox 142 can shift the center of gravity forward and can better meet the overall assembly requirements of certain electric ATVs. The torque transmission direction, shown by the arrows, is rearward in both the electric motor 141 and the rear differential 162, i.e., in the same direction in both the electric motor 141 and the rear differential 162 rather than in opposite directions.

FIGS. 19-24 show an alternative embodiment in which the drive train 16 also includes at least one, and more preferably two, drive train offsets 167, such as a front drive train offset 1671 and a rear drive train offset 1672. Each drive train offset 167 includes an input shaft 1673 and an output shaft 1674 connected together in a transmission mode and preferably facing in opposing directions, with their ends extending outside of a drive train offset housing 1670. The preferred connection method is via gear meshing, but alternatively belt transmission or other connection methods that can transmit torque can be used. The front drive train offset 1671 is mounted between the drive shaft 163 and the front differential 161, and the rear drive train offset 1672 is mounted between the drive shaft 163 and the drive system 14 and/or rear differential 162.

Figure 20:
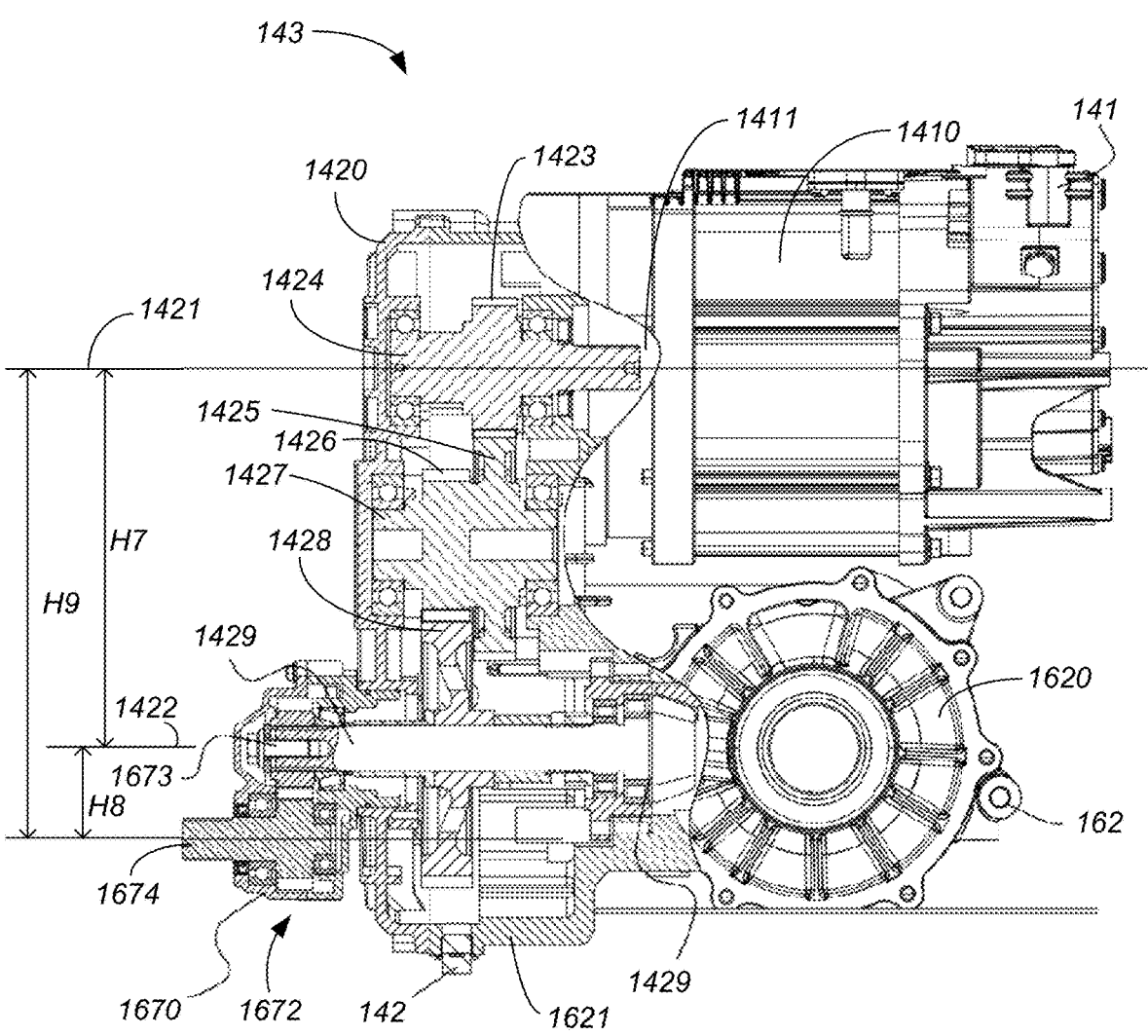
FIG. 20 is a left side view of the prime mover assembly of FIG. 19, omitting the MCU, and showing the gearbox assembly and rear drive train offset in cross-section taken at the longitudinal mid-plane.
Figure 21:
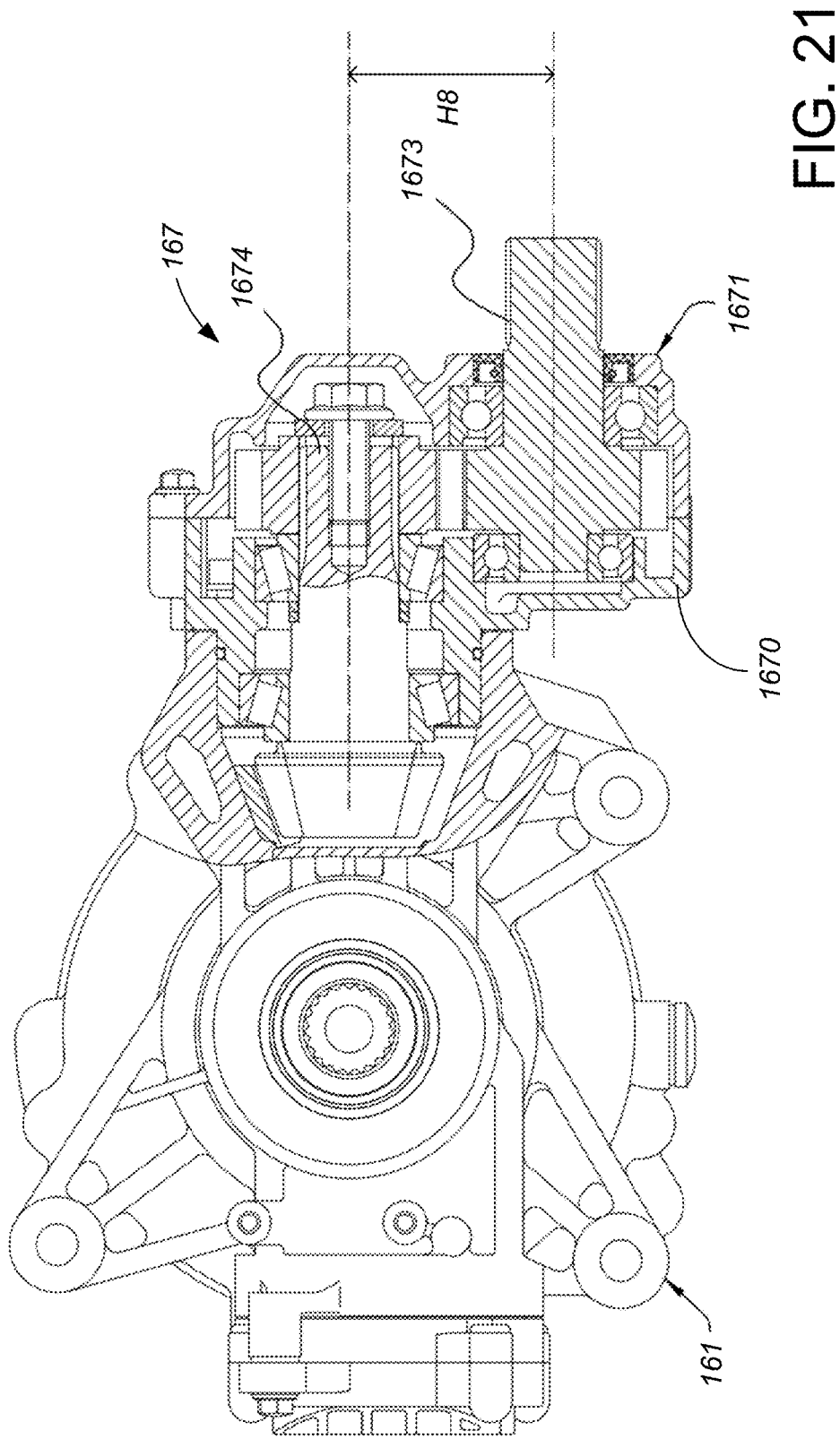
FIG. 21 is a left side view of the front drive train offset and front differential of FIG. 19, showing the front drive train offset in cross-section taken at the longitudinal mid-plane.
Figure 22:
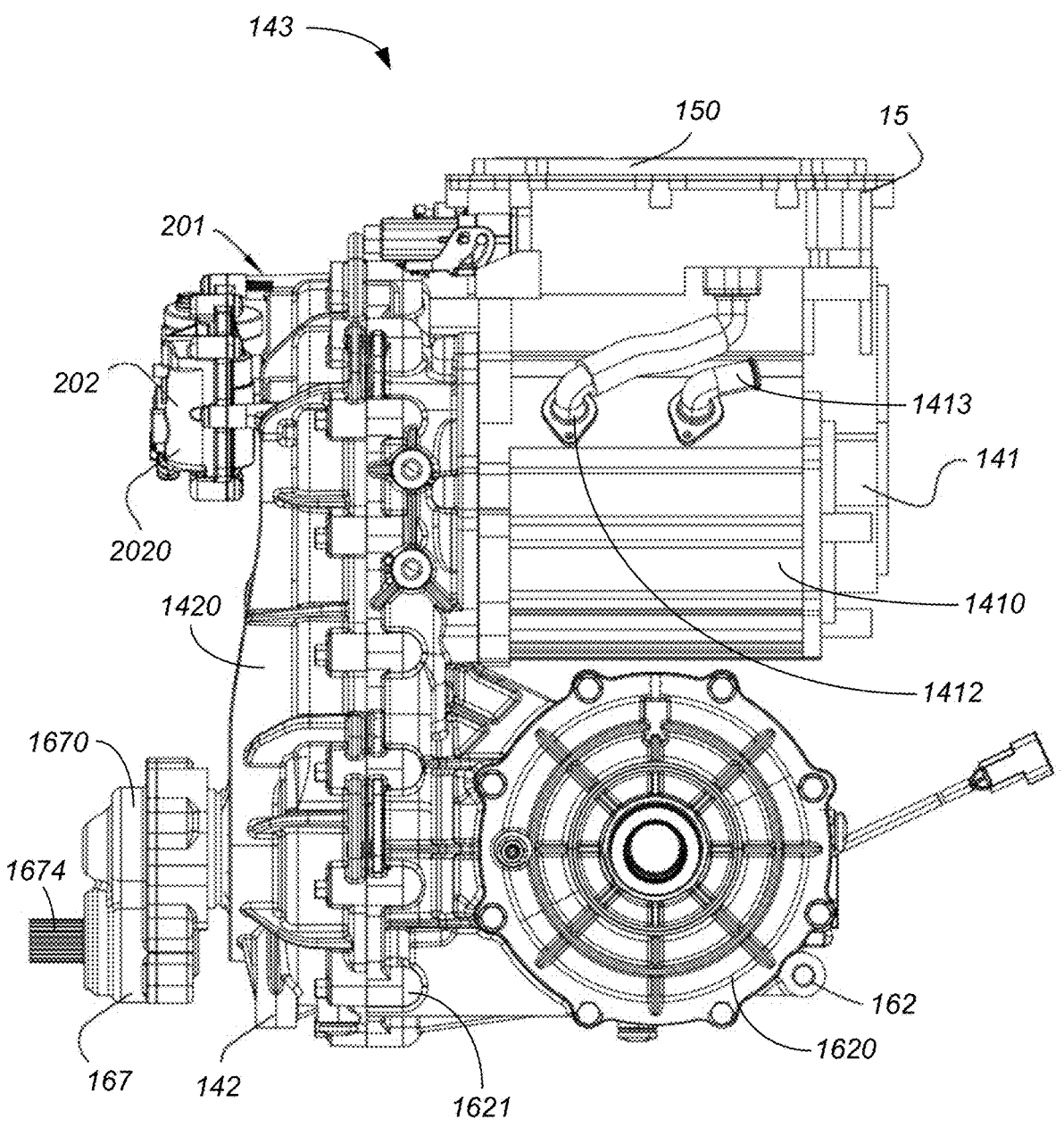
FIG. 22 is a left side view of the prime mover assembly of FIG. 19, adding an engine parking brake.

As called out in FIGS. 20 and 21, the distance from the rotational axis of the input shaft 1673 to the rotational axis of the output shaft 1674 is defined as an offset distance H8 of the drive train offset 167. The offset distance H8 of the drive train offset 167 is preferably in the range from 30 mm to 300 mm and more preferably in the range from 50 mm to 150 mm. The offset distance H8 can change the location of the transmission path and change the layout space of the electric ATV 100 according to design requirements. In the embodiment of FIGS. 19-24, the layout position of the battery pack 17 can be lowered, lowering the center of gravity of the electric ATV 100 and improving the driving stability of the electric ATV 100. For a given saddle height, lowering the layout position of the battery pack 17 can increase the space used to accommodate battery pack 17, thereby making the capacity of battery pack 17 larger and the endurance of electric ATV 100 longer. When the input shaft 1673 and the output shaft 1674 are connected via gear meshing, the use of two drive train offsets 1671, 1672 also changes the clockwise/counterclockwise rotational direction of the drive shaft 163.

In the preferred embodiments, the axis of the input shaft 1673 is substantially parallel to and vertically aligned with the axis of the output shaft 1674. The drive train offsets 167 allow the range of the gearbox offset distance H7 (discussed in relation to FIGS. 15 and 16) to be larger. As shown in FIG. 20, a total offset distance H9 from the gearbox input axis 1421 to the axis of the rear offset output shaft 1674 is preferably in the range from 80 mm to 900 mm and more preferably in the range from 150 mm to 450 mm, which can effectively control the overall height of prime mover assembly 143, enhance the integration and compactness of prime mover assembly 143, and reduce the layout space on the entire vehicle.

As an alternative to the meshed gears shown in FIG. 20, connection methods such as bevel gears may alternatively be used to define a certain angle between the axis of the input shaft 1673 and the axis of the output shaft 1674, thereby changing the output angle of the driving force/torque and making the spatial layout of the electric ATV 100 more flexible. Appropriately designed drive train offsets can therefore allow the drive system to be mounted in essentially any orientation on the frame 11. In some alternative embodiments, the drive train offset(s) 167 may be mounted with the input shaft 1673 at least partially on the left or right side of the output shaft 1674. With a sufficient offset distance H8, the use of the drive train offsets 1671, 1672 can allow the drive shaft 163 to be arranged on the left or right side of the battery pack 17, which allows the battery pack 17 to be further lowered.

Figure 24:
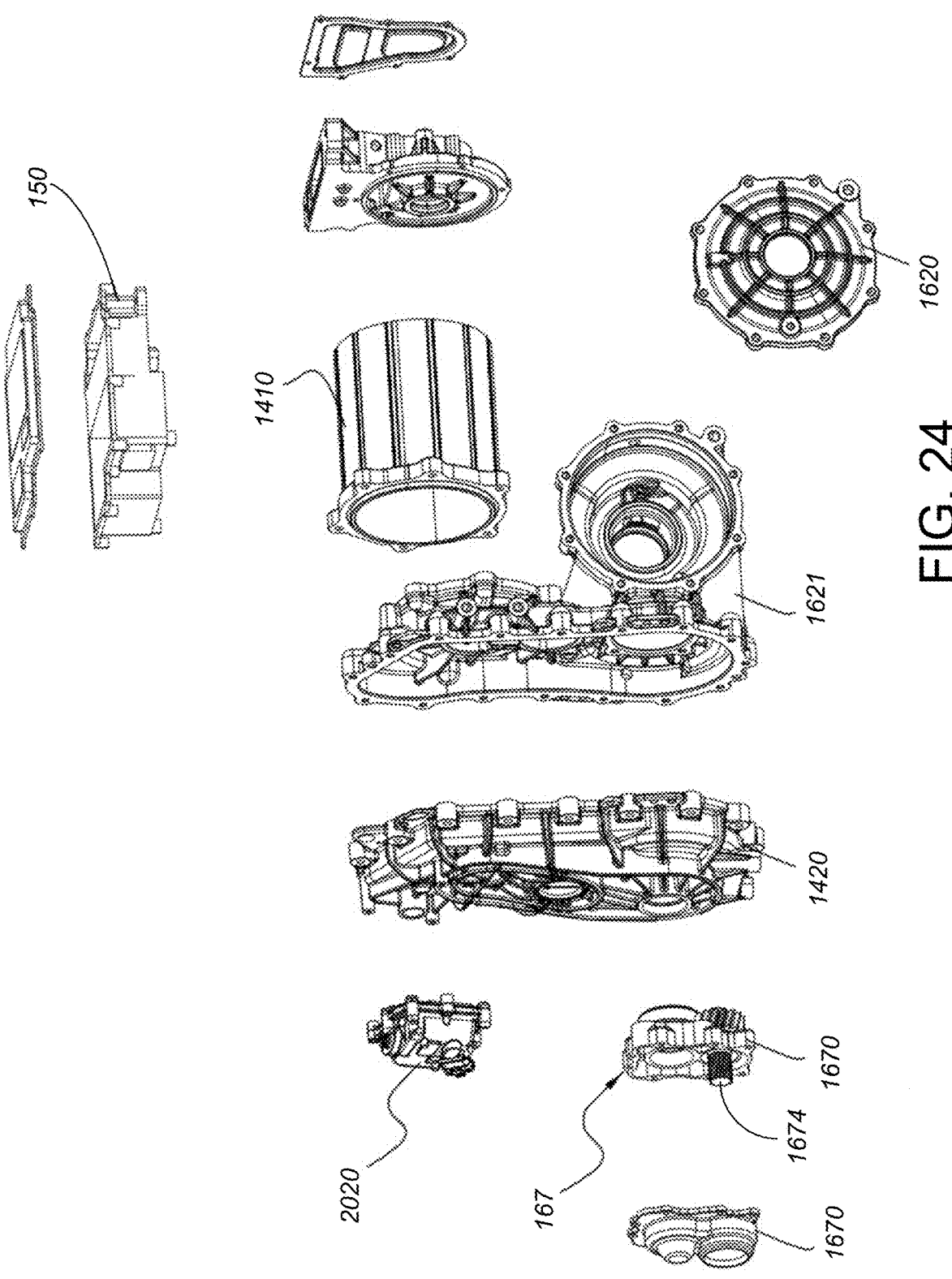
FIG. 24 is an exploded front left perspective view of the housings used in the prime mover assembly of FIGS. 22 and 23.

FIG. 24 shows the various independent housings of the preferred prime mover assembly 143. At least part of the covering for the gearbox assembly 142 and part of the covering of the rear differential 162 may be integrally formed, preferably by casting, as a single gearbox/differential housing body 1621, thereby reducing assembly difficulty. The rear differential housing 1620, the gearbox housing 1420, the motor housing 1410, the engine parking brake housing 2020 and at least part of the offset housing 1670 are all connected to the gearbox/differential housing body 1621 by means of bolts (not shown). Lubricant is provided inside the gearbox/differential housing body 1621.

The prime mover assembly 143 is integrated to obtain a maximum power per volume. The maximum power of the prime mover assembly 143 is defined as P, and the volume of the prime mover assembly 143 is defined as V. A ratio P/V of the power P of the prime mover assembly 143 to its volume V is preferably in the range from 1.25 $W/cm^3$ to 12 $W/cm^3$, more preferably in the range from 2.5 $W/cm^3$ to 8 $W/cm^3$, and most preferably in the range from 3.3 $W/cm^3$ to 6 $W/cm^3$. The prime mover assembly 143 provides sufficient torque while having a higher power density, which is in line with the lightweight requirements of the ATV 100.

The preferred embodiments shown in the figures mount the prime mover assembly 143 on the rear frame assembly 112 at least partially positioned below the seat cushion 121 (see FIG. 3). Alternatively the prime mover assembly could be mounted at the front end of the electric ATV 100.

In the description of this application, "fixation" and/or "fixedly connected" is limited to a non-pivot connection method, that is, the two components set as fixed connections cannot undergo relative displacement or relative rotation in the connected state.

The above-mentioned embodiments only represent several embodiments of the present invention, and the descriptions thereof are relatively specific and detailed, but should not be construed as a limitation to the scope. Workers of ordinary skill in the art may make numerous modifications and improvements without departing from the concepts of the present invention. Therefore, the protection scope of the patent of the present invention is defined to include the full breadth of the appended claims.

The invention claimed is:

1. An electric all-terrain vehicle (ATV) comprising:
a frame;
a vehicle cover at least partially arranged on the frame;
a set of wheels comprising at least two front wheels defining a front wheel axis centerline and at least two rear wheels defining a rear wheel axis, the set of wheels being arranged on the frame, with a wheelbase distance being defined between the front wheel axis centerline and the rear wheel axis;
a drive system supported by the frame, the drive system comprising an electric motor;
a battery pack supported by the frame for providing electric energy for the electric motor for locomotion of the electric ATV; and
a Motor Control Unit (MCU) electrically connected to the electric motor;
wherein a projection of the MCU, a projection of the battery pack, and a projection of the electric motor all on a horizontal plane cooperatively define a Tri-core system projection area with a maximum Tri-core longitudinal length, wherein a ratio of the wheelbase distance to the Tri-core longitudinal length is in the range from 0.7 to 2.5;
wherein the electric motor is packaged in a prime mover assembly further comprising a gearbox assembly, a differential and a drive train offset; the gearbox assembly comprising a gearbox input shaft having a gearbox input shaft axis, the drive train offset comprising an offset output shaft having an offset output shaft axis, wherein a total offset distance from the gearbox input shaft axis to the offset output shaft axis is in the range from 80 mm to 900 mm.

2. The electric ATV of claim 1, wherein the ratio of the wheelbase distance to the Tri-core longitudinal length is in the range from 0.9 to 2.0.

3. The electric ATV of claim 1, wherein a Tri-core front distance from a front edge of the Tri-core system projection area to the front wheel axis centerline is in the range from 0 mm to 1500 mm, and wherein a Tri-core rear distance from a rear edge of the Tri-core system projection area to the rear wheel axis is in the range from 0 mm to 1500 mm.

4. The electric ATV of claim 1, wherein the MCU is positioned behind the battery pack and in front of the electric motor, with a shortest side length of the MCU extending longitudinally.

5. The electric ATV of claim 1, wherein the MCU is mounted at least partially over one of the battery pack and the electric motor.

6. The electric ATV of claim 5, wherein the battery pack is positioned in front of the electric motor, and wherein the MCU is at least partially positioned over the electric motor.

7. The electric ATV of claim 1, wherein the electric ATV defines a longitudinal mid-plane, wherein the longitudinal mid-plane at least partially intersects the all of the battery pack, the MCU and the electric motor.

8. The electric ATV of claim 1, wherein the battery pack, the electric motor, and the MCU collectively define a maximum projection area on a vertical transverse plane, wherein at least two of a projection of the battery pack, a projection of the electric motor, and a projection of the MCU all on a vertical transverse plane overlap to define a projection overlapping area, and wherein a ratio of the projection overlapping area to the maximum projection area is in the range from 0.4 to 1.0.

9. The electric ATV of claim 8, wherein the electric ATV defines a longitudinal mid-plane, wherein the longitudinal mid-plane at least partially intersects the all of the battery pack, the MCU and the electric motor.

10. The electric ATV of claim 1, wherein the total offset distance from the gearbox input shaft axis to the offset output shaft axis is in the range from 150 mm to 450 mm.

11. The electric ATV of claim 1, wherein the electric motor and the differential are mounted rearwardly of the gearbox assembly, and the drive train offset is mounted forwardly of the gearbox assembly.

12. The electric ATV of claim 1, wherein the prime mover assembly comprises an electric motor housing adapted to circulate liquid coolant around the electric motor.

13. The electric ATV of claim 1, further comprising a straddle seat supported by the frame.

14. The electric ATV of claim 13, wherein the battery pack is positioned so as to be between the legs of a rider seated on the straddle seat.

15. An electric all-terrain vehicle (ATV) comprising:
a frame;
a vehicle cover at least partially arranged on the frame;
a set of wheels comprising at least two front wheels defining a front wheel axis centerline and at least two rear wheels defining a rear wheel axis, the set of wheels being arranged on the frame, with a wheelbase distance being defined between the front wheel axis centerline and the rear wheel axis;
a drive system supported by the frame, the drive system comprising an electric motor;

a battery pack supported by the frame for providing electric energy for the electric motor for locomotion of the electric ATV; and a Motor Control Unit (MCU) electrically connected to the electric motor;

wherein a projection of the MCU, a projection of the battery pack, and a projection of the electric motor all on a horizontal plane cooperatively define a Tri-core system projection area with a maximum Tri-core longitudinal length, wherein a ratio of the wheelbase distance to the Tri-core longitudinal length is in the range from 0.7 to 2.5.

16. The electric ATV of claim 15, wherein the ratio of the wheelbase distance to the Tri-core longitudinal length is in the range from 0.9 to 2.0.

17. The electric ATV of claim 15, wherein a Tri-core front distance from a front edge of the Tri-core system projection area to the front wheel axis centerline is in the range from 0 mm to 1500 mm, and wherein a Tri-core rear distance from a rear edge of the Tri-core system projection area to the rear wheel axis is in the range from 0 mm to 1500 mm.

18. The electric ATV of claim 15, wherein at least two projections of a projection of the battery pack, a projection of the MCU, and a projection of the electric motor, projected on a transverse vertical plane, at least partially overlap.

19. The electric ATV of claim 15, further comprising a drive train with a drive shaft and a transfer case, the transfer case allowing selected interruption or continuation of driving torque transmission between the drive system and the drive shaft such that when the transfer case interrupts torque transmission, the drive shaft does not rotate.

20. The electric ATV of claim 15, wherein the electric motor and the MCU are provided as parts of a prime mover assembly, the prime mover assembly further comprising:

a gearbox assembly with a gearbox housing, with the electric motor on the gearbox housing;

an engine parking brake controlled by the MCU, the engine parking brake being mounted on a side of the gearbox housing opposite the electric motor; and a rear differential, with the rear differential being driven by the electric motor through the gearbox assembly in a transmission mode.

* * * * *